United States Patent
Du

(10) Patent No.: US 12,216,917 B2
(45) Date of Patent: Feb. 4, 2025

(54) DATA PROCESSING CIRCUIT AND METHOD, AND SEMICONDUCTOR MEMORY

(71) Applicant: CHANGXIN MEMORY TECHNOLOGIES, INC., Hefei (CN)

(72) Inventor: Tao Du, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 45 days.

(21) Appl. No.: 18/152,961

(22) Filed: Jan. 11, 2023

(65) Prior Publication Data
US 2023/0384945 A1    Nov. 30, 2023

Related U.S. Application Data

(63) Continuation of application No. PCT/CN2022/109152, filed on Jul. 29, 2022.

(30) Foreign Application Priority Data

May 31, 2022    (CN) .......................... 202210611694.7

(51) Int. Cl.
     *G06F 3/06*    (2006.01)
(52) U.S. Cl.
     CPC .......... *G06F 3/0619* (2013.01); *G06F 3/0653* (2013.01); *G06F 3/0659* (2013.01); *G06F 3/0673* (2013.01)
(58) Field of Classification Search
     CPC ...... G05B 13/00–048; G05B 15/00–02; G05B 17/00–02; G06F 1/00–3296;
(Continued)

(56) References Cited

U.S. PATENT DOCUMENTS 7,353,438 B2 *   4/2008   Leung ................. G06F 11/1048
                                                      714/E11.049
7,760,737 B2 *   7/2010   Rana ....................... H04L 47/34
                                                      370/473

(Continued)

FOREIGN PATENT DOCUMENTS

| CN | 105023616 A | 11/2015 |
|---|---|---|
| CN | 113314179 A | 8/2021 |

(Continued)

OTHER PUBLICATIONS

H. Jung, H. Shim, S. Park, S. Kang and J. Cha, "LRU-WSR: integration of LRU and writes sequence reordering for flash memory," in IEEE Transactions on Consumer Electronics, vol. 54, No. 3, pp. 1215-1223, Aug. 2008, doi: 10.1109/TCE.2008.4637609. (Year: 2008).*

(Continued)

*Primary Examiner* — Daniel C. Chappell
(74) *Attorney, Agent, or Firm* — Syncoda LLC; Feng Ma

(57) ABSTRACT

The present disclosure provides a data processing circuit and method, and a semiconductor memory, relating to the field of storage technologies. The circuit includes: a data selection module configured to receive and output write data if a received write control command is in a first level state, and receive and output read data if a received read control command is in the first level state; a check module configured to receive the write data or the read data, check the write data or the read data, and obtain write check data or read check data, and output the write check data or the read check data; and a data output module configured to receive the write check data or the read check data, output the write check data if the write control command is in the first level state.

13 Claims, 9 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 11,061,767 | B2* | 7/2021 | Zhu | G06F 11/1012 |
| 11,373,709 | B2 | 6/2022 | Kim | |
| 11,989,450 | B2* | 5/2024 | Yudanov | G06F 3/0673 |
| 2003/0182611 | A1* | 9/2003 | Wu | G06F 11/1052 714/752 |
| 2005/0229077 | A1* | 10/2005 | Takahashi | G06F 11/1008 714/E11.034 |
| 2015/0089316 | A1* | 3/2015 | Zhang | H03M 13/6561 714/755 |
| 2017/0083401 | A1* | 3/2017 | Ryu | G11C 11/1677 |
| 2017/0220413 | A1* | 8/2017 | Cha | G06F 3/064 |
| 2021/0194999 | A1* | 6/2021 | Du | H04L 45/04 |
| 2021/0311666 | A1* | 10/2021 | Ning | G06F 3/0604 |
| 2023/0039473 | A1* | 2/2023 | Du | G06F 30/398 |
| 2023/0259682 | A1* | 8/2023 | Du | G06F 30/394 716/100 |
| 2024/0329885 | A1* | 10/2024 | Yudanov | G06F 3/0659 |

FOREIGN PATENT DOCUMENTS

| | | |
|---|---|---|
| CN | 114187934 A | 3/2022 |
| JP | 2012198962 A | 10/2012 |

OTHER PUBLICATIONS

K. Khalifa, H. Fawzy, S. El-Ashry and K. Salah, "Memory controller architectures: A comparative study," 2013 8th IEEE Design and Test Symposium, Marrakesh, 2013, pp. 1-6, doi: 10.1109/IDT.2013.6727083. (Year: 2013).*

X. Zhang, "VLSI Architectures for Reed-Solomon Codes: Classic, Nested, Coupled, and Beyond," in IEEE Open Journal of Circuits and Systems, vol. 1, pp. 157-169, 2020, doi: 10.1109/OJCAS.2020.3019403. (Year: 2020).*

International Search Report cited in PCT/CN2022/109152 mailed Nov. 25, 2022, 9 pages.

* cited by examiner

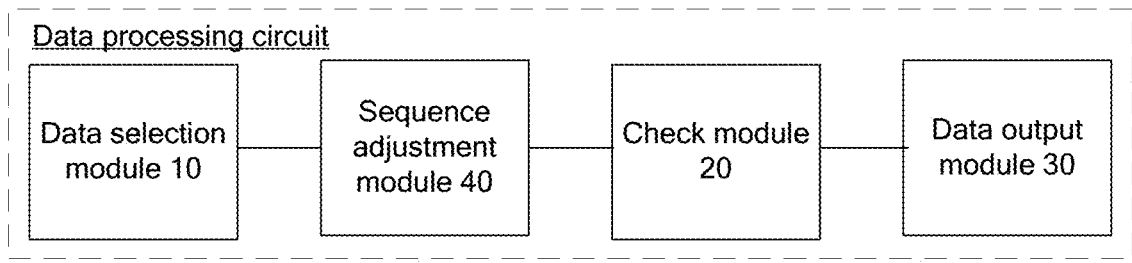
FIG. 10
| Burst length | Burst type | C3 | C2 | C1 | C0 | Burst type |||||||||||||||
|---|---|---|---|---|---|---|---|---|---|---|---|---|---|---|---|---|---|---|---|---|
| | | | | | | 1 | 2 | 3 | 4 | 5 | 6 | 7 | 8 | 9 | 10 | 11 | 12 | 13 | 14 | 15 | 16 |
| BC8 | SEQ | 0 | 0 | V | V | 0 | 1 | 2 | 3 | 4 | 5 | 6 | 7 | T | T | T | T | T | T | T | T |
| | | 0 | 1 | V | V | 4 | 5 | 6 | 7 | 0 | 1 | 2 | 3 | T | T | T | T | T | T | T | T |
| | | 1 | 0 | V | V | 8 | 9 | A | B | C | D | E | F | T | T | T | T | T | T | T | T |
| | | 1 | 1 | V | V | C | D | E | F | 8 | 9 | A | B | T | T | T | T | T | T | T | T |
| BL16 | SEQ | 0 | 0 | V | V | 0 | 1 | 2 | 3 | 4 | 5 | 6 | 7 | 8 | 9 | A | B | C | D | E | F |
| | | 0 | 1 | V | V | 4 | 5 | 6 | 7 | 0 | 1 | 2 | 3 | C | D | E | F | 8 | 9 | A | B |
| | | 1 | 0 | V | V | 8 | 9 | A | B | C | D | E | F | 0 | 1 | 2 | 3 | 4 | 5 | 6 | 7 |
| | | 1 | 1 | V | V | C | D | E | F | 8 | 9 | A | B | 4 | 5 | 6 | 7 | 0 | 1 | 2 | 3 |
FIG. 11
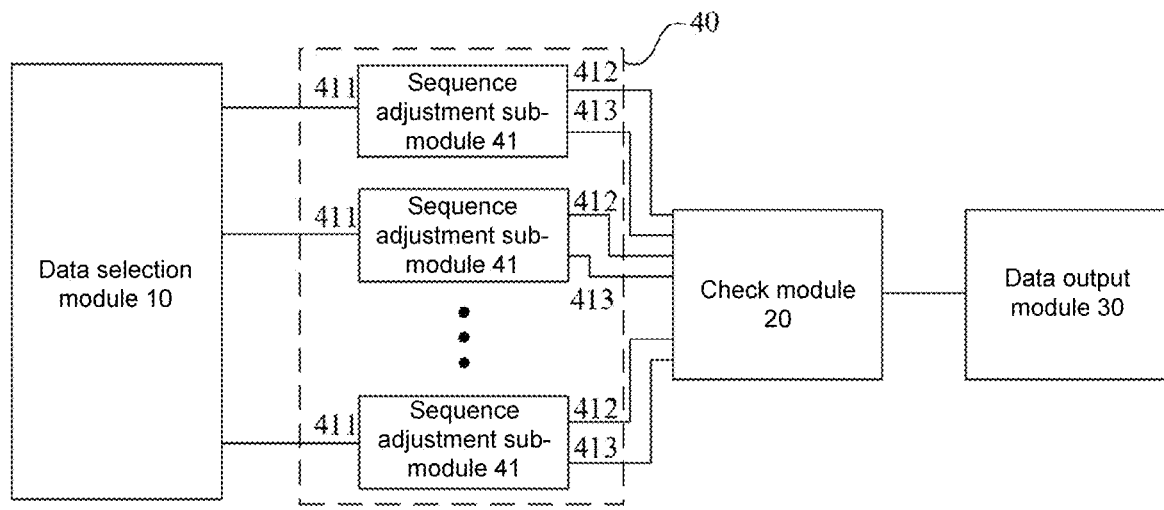
FIG. 12

DATA PROCESSING CIRCUIT AND METHOD, AND SEMICONDUCTOR MEMORY

CROSS-REFERENCE TO RELATED APPLICATIONS

This is a continuation of International Application No. PCT/CN2022/109152, filed on Jul. 29, 2022, which claims the priority to Chinese Patent Application 202210611694.7, titled "DATA PROCESSING CIRCUIT AND METHOD, AND SEMICONDUCTOR MEMORY" and filed on May 31, 2022. The entire contents of International Application No. PCT/CN2022/109152 and Chinese Patent Application 202210611694.7 are incorporated herein by reference.

TECHNICAL FIELD

The present disclosure relates to the field of storage technologies, and in particular, to a data processing circuit and method, and a semiconductor memory.

BACKGROUND

With rapid development of a semiconductor storage technology, the problems such as the integration of a semiconductor memory and the reliability of write data and read data have become one of the research directions of the semiconductor storage technology.

At present, in the development process of reducing the size of the semiconductor memory, there is a lack of a technical solution that can effectively ensure the reliability of data reading and writing.

It should be noted that the information disclosed above is merely intended to facilitate a better understanding of the background of the present disclosure, and therefore may include information that does not constitute the prior art known to those of ordinary skill in the art.

SUMMARY

The present disclosure provides a data processing circuit and method.

According to one aspect of the present disclosure, a data processing circuit is provided. The data processing circuit includes:
 a data selection module configured to receive and output write data if a received write control command is in a first level state, and receive and output read data if a received read control command is in the first level state;
 a check module configured to receive the write data or the read data, check the write data or the read data, and obtain write check data or read check data, and output the write check data or the read check data; and
 a data output module configured to receive the write check data or the read check data, output the write check data if the write control command is in the first level state, and output the read check data if the read control command is in the first level state.

According to another aspect of the present disclosure, a data processing method is provided. The data processing method is applied to the data processing circuit, and includes:
 receiving and outputting, by a data selection module, write data if a received write control command is in a first level state, and receiving and outputting, by the data selection module, read data if a received read control command is in the first level state;
 receiving, by a check module, the write data or the read data, checking the write data or the read data, and obtaining write check data or read check data, and outputting the write check data is or the read check data; and
 receiving, by a data output module, the write check data or the read check data, outputting the write check data if the write control command is in the first level state, and outputting the read check data if the read control command is in the first level state.

According to another aspect of the present disclosure, a semiconductor memory is provided. The semiconductor memory includes:
 the data processing circuit; and a semiconductor memory cell array.

It should be understood that the above general description and the following detailed description are merely exemplary and explanatory, and should not be construed as a limitation to the present disclosure.

BRIEF DESCRIPTION OF THE DRAWINGS

The accompanying drawings incorporated into the specification and constituting part of the specification illustrate the embodiments of the present disclosure, and serve, together with the specification, to explain the principles of the present disclosure. Apparently, the accompanying drawings in the following description show merely some embodiments of the present disclosure, and those of ordinary skill in the art may still derive other accompanying drawings from these drawings without creative efforts.

FIG. 10 is a schematic structural diagram of another data processing circuit according to one embodiment of the present disclosure;

FIG. 11 is a schematic format diagram of read and write commands;

FIG. 12 is a schematic structural diagram of another data processing circuit according to one embodiment of the present disclosure;

DETAILED DESCRIPTION

Figure 1:
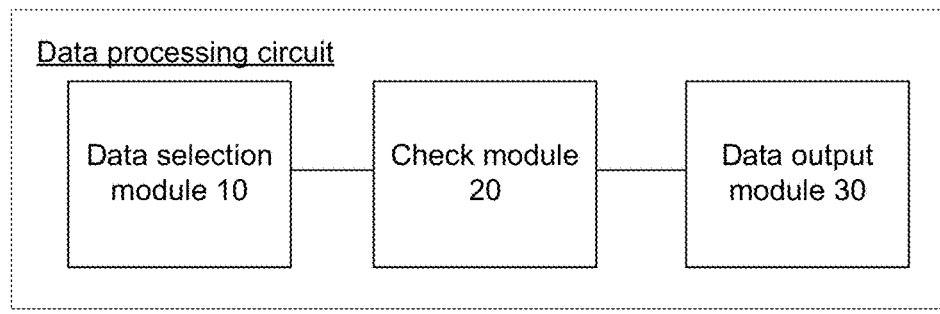
FIG. 1 is a schematic structural diagram of a data processing circuit according to one embodiment of the present disclosure.

Exemplary embodiments will be described below comprehensively with reference to the accompanying drawings. However, the exemplary embodiments can be implemented in various forms and should not be construed as being limited to examples described herein. On the contrary, these embodiments are provided such that the present disclosure is comprehensive and complete, and fully conveys the concept of the exemplary embodiments to those skilled in the art. The described features, structures, or characteristics may be incorporated into one or more embodiments in any suitable manner.

Besides, the accompanying drawings are merely exemplary illustrations of the present disclosure, and are not necessarily drawn to scale. The same reference numerals in the figures indicate the same or similar parts, and thus their detailed descriptions will be omitted. Some of the block diagrams shown in the accompanying drawings are functional entities, and do not necessarily correspond to physically or logically independent entities. These functional entities may be implemented in the form of software, or implemented in one or more hardware modules or integrated circuits, or implemented in different networks and/or processor apparatuses and/or microcontroller apparatuses.

It should be understood that the various steps described in the method embodiments of the present disclosure may be performed in different orders and/or in parallel. Furthermore, the method embodiments may include additional steps and/or omit performing the illustrated steps. The scope of the present disclosure is not limited in this regard.

It should be noted that the concepts such as "first" and "second" mentioned in the present disclosure are only configured to distinguish different devices, modules or units, and are not configured to limit the order of functions performed by these devices, modules or units or interdependence.

It should be noted that the modifications of "a" and "plurality" mentioned in the present disclosure are illustrative rather than restrictive, and those skilled in the art should understand them as "one or more" unless they are clearly indicated in the context.

In the description of the present disclosure, it should be noted that unless otherwise specified, the meaning of "plurality" is two or more. The terms such as "left", "right", "left", "right", "inner" and is "outer" indicate the orientation or position relationships. These terms are merely intended to facilitate description of the present disclosure and simplify the description, rather than to indicate or imply that the mentioned apparatus or element must have a specific orientation and must be constructed and operated in a specific orientation. Therefore, these terms should not be construed as a limitation to the present disclosure. "Vertical" is not strictly vertical, but within the allowable range of errors. "Parallel" is not strictly parallel, but within the allowable range of errors.

The orientation words appearing in the following description are all directions shown in the drawings, and do not limit the specific structure of the present disclosure. In the present disclosure, unless otherwise clearly specified, the term "interconnection" or "connection" should be understood in a broad sense. For example, the connection may be a fixed connection, a detachable connection, or an integrated connection; a direct connection or an indirect connection via an intermediate medium. Those of ordinary skill in the art should understand the specific meanings of the above terms in the present disclosure based on specific situations.

Currently, in the development process of the semiconductor memory such as a dynamic random access memory (DRAM), the development tends to improve the integration of the semiconductor memory.

However, in this development process, how to effectively improve the reliability of data reading and writing while taking into account the area occupied by a memory circuit has become one of the problems to be solved urgently.

The inventor found through research that the reliability of the read data and the write data may be affected by storage errors in the data reading process and data writing process, or link errors between a memory array and a memory controller.

On this basis, the embodiments of the present disclosure provide a data processing circuit and method, and a semiconductor memory. It is not necessary to process the write data and the read data respectively by using different data processing circuits, the write data or the read data may be checked only through one data processing circuit according to the write control command and the read control command, and the write check data for performing correctness checking on the write data or the read check data for performing the correctness checking on the read data is generated, thereby ensuring the reliability of data reading and writing while taking the size of the semiconductor memory into account.

In some embodiments of the present disclosure, the data processing circuit may also include a sequence adjustment module. The sequence adjustment module may also perform a data transmission sequence adjustment operation on the write data or the read data according to a sequence adjustment control signal after the read data or the write data is inputted into the sequence adjustment module, adjust the write data or the read data to a correct transmission sequence, and then input the write data or the read data into the check module, thereby ensuring the correctness of the write data or the read data inputted into the check module. Thus, the correctness of the outputted write check data or read check data may be improved, and the reliability of data reading and writing may be further improved.

Before introducing the technical solutions provided in the embodiments of the present disclosure, the technical terms involved in the embodiments of the present disclosure will be described next.

The write data may refer to data written into the memory cell array of the semiconductor memory.

The read data may refer to data that needs to be read from the memory cell array of the semiconductor memory to the outside.

The write control command, or referred to as a write command or a write control signal, may be a signal for instructing the semiconductor memory to write data. For example, the write control command may be a level signal. If the write control command is in the first level state, the semiconductor memory may be controlled to write data; and if the write control command is in a fourth level state, the semiconductor memory may be controlled to stop writing data. One of the first level state and the fourth level state is at a high level, and the other is at a low level.

The read control command, or referred to as a read command or a read control signal, may be a signal for instructing the semiconductor memory to read data. The read control command and the write control command have the same control mode, and reference may be made to the relevant description of the write control command in the above part, which will not be repeated herein.

After the above concepts are introduced, the present exemplary implementation is described in detail below with reference to the accompanying drawings and embodiments.

The data processing circuit is provided in the embodiments of the present disclosure, which will be described next with reference to FIG. 1 to FIG. 18.

FIG. 1 is a schematic structural diagram of a data processing circuit according to one is embodiment of the present disclosure. As shown in FIG. 1, the data processing circuit provided in the embodiments of the present disclosure may include a data selection module 10, a check module 20, and a data output module 30. The check module 20 is connected to the data selection module 10 and the data output module 30 respectively.

Next, the data selection module 10, the check module 20, and the data output module 30 will be described in sequence.

The data selection module 10 may be configured to receive the write data and output the write data if the received write control command is in the first level state, or receive the read data and output the read data if the received read control command is in the first level state.

The first level state may be a level that controls the data selection module 10 to receive corresponding data (the write data or the read data). For example, the first level state may be a high-level state or a low-level state. For example, if the first level state is a high-level state, when the write control command is at a high level, the data selection module 10 selects to receive the write data and transmits same to the check module 20. Moreover, when the read control command is in the first level state, the data selection module 10 selects to receive the read data and transmits same to the check module 20.

For the read control command and the write control command, in one example, the read operation and the write operation of the semiconductor memory may not be performed simultaneously, and accordingly, the read control command and the write control command may be mutually exclusive signals.

Figure 17:
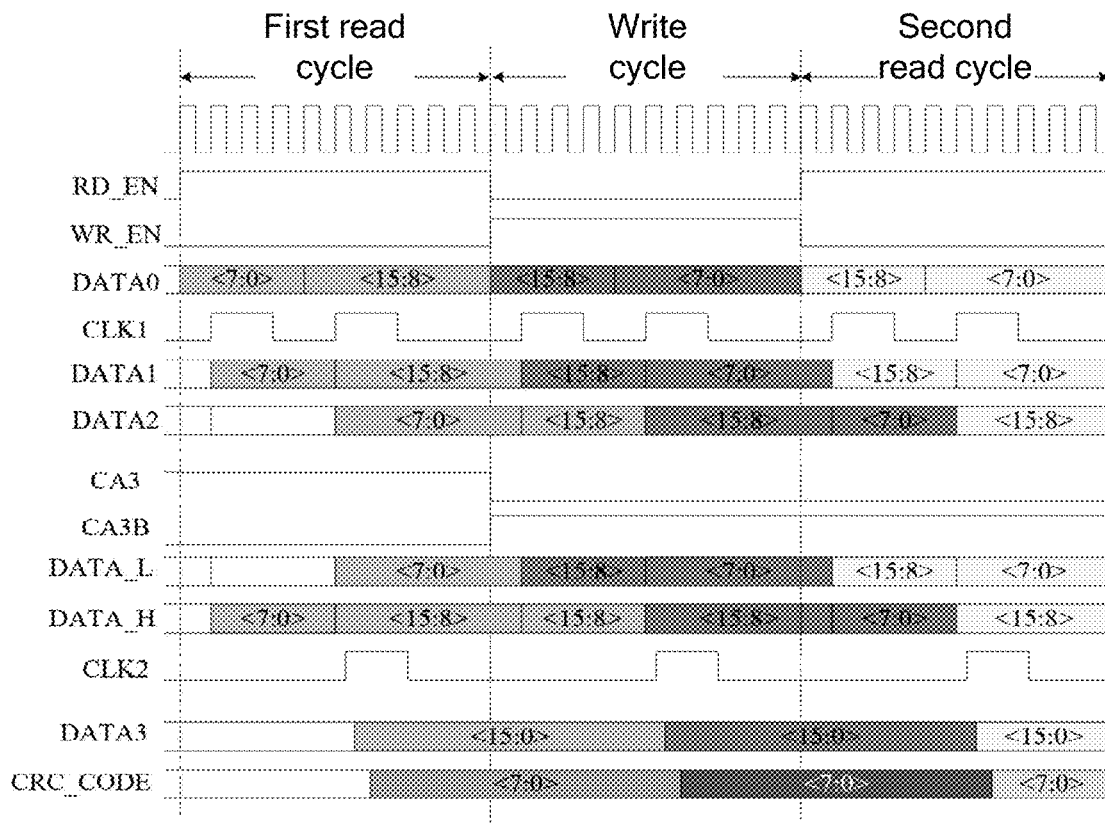
FIG. 17 is a schematic diagram of signals and data involved in an exemplary sequence adjustment circuit according to one embodiment of the present disclosure.

For example, when the write operation is performed, the write control command is in the first level state, and the read control command is in the fourth level state. Accordingly, the data selection module 10 may receive and output the write data within the data transmission cycle under the control of the write control command. The data transmission cycle in which the write data is processed may be called a write cycle. For example, as shown in FIG. 17, one data transmission cycle in which the write control command is in the first level state (high level) is one write cycle.

For example, when the read operation is performed, the read control command is in the first level state, and the write control command is in the fourth level state. Accordingly, the data selection module 10 may receive and output the read data within the data transmission cycle under the control of the read control command. The data transmission cycle in which the read data is processed may be called a read cycle. For example, as shown in FIG. 17, one data transmission is cycle in which the read control command is in the first level state is one read cycle.

For the data output mode of the data selection module 10. In some embodiments, to improve the data processing efficiency, the data selection module 10 may transmit the read data or the write data to the check module 20 through n data lines. Correspondingly, the data selection module 10 may transmit the read data or the write data to the check module 20 in parallel by n channels. The data selection module 10 may transmit the write data through P data transmission cycles, or may transmit the read data through P data transmission cycles. P may be a positive integer greater than or equal to 1.

Within one data transmission cycle, each data line may transmit k-bit data serially. Both n and k may be a positive integer greater than or equal to 1. The values of n and k may be set according to actual situations and specific requirements. For example, n may be 8, 16, etc., and k may be 2, 4, 8, 16, etc., which are not specifically limited.

For example, taking an example where k is equal to 2, within one data transmission cycle, the data selection module 10 may transmit 2n bits of data to the check module 20 through n data lines. Among the 2n bits, the (n+1)-th bit to the 2n-th bit are transmitted in parallel, and the first bit to the n-th bit are transmitted in parallel. 2 bits of data may be serially transmitted through each data line within one data transmission cycle. For example, the i-th bit and the (i+n)-th bit among the 2n bits are serially transmitted by using a same data line (such as the i-th data line). i is a positive integer greater than or equal to 1 and less than or equal to n.

It should be noted that, among the 2n bits of write data or write data, if the 0-th bit to the (n−1)-th bit are transmitted first, and the n-th bit to the (2n−1)-th bit are transmitted later, then the i-th bit transmitted may be the (i−1)-th bit in the write data or the read data, and the (i+n)-th bit transmitted may be the (i+n−1)-th bit in the write data or the read data. On the contrary, among the 2n bits of write data or write data, if the n-th bit to the (2n−1)-th bit are transmitted first, and the 0-th bit to the (n−1)-th bit are transmitted later, then the i-th bit transmitted may be the (i+n−1)-th bit in the write data or the read data, and the (i+n)-th bit transmitted may be the (i−1)-th bit in the write data or the read data.

Regarding the number of data selection modules 10, in one embodiment, the data may be transmitted in parallel to the check module 20 through r data selection modules 10. It should be noted that, r may be determined according to actual transmission requirements of the memory chip and the specific transmission circuit. For example, r may be an integer such as 4, 8, or 16, which is not specifically limited.

Next, the above data transmission process is described by taking an example where r=8 and n=8.

Figure 2:
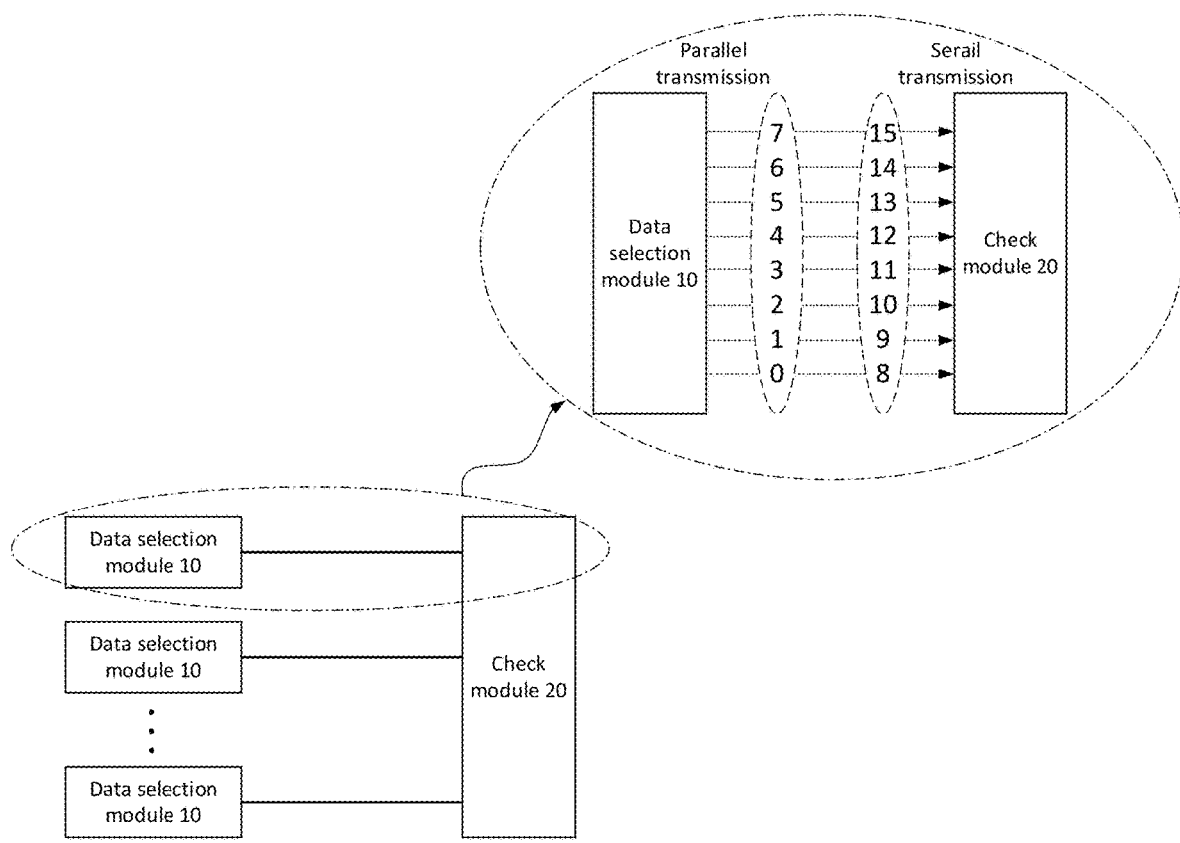
FIG. 2 is a schematic diagram of an exemplary data transmission process according to one embodiment of the present disclosure.

In one example, FIG. 2 is a schematic diagram of an exemplary data transmission process according to one embodiment of the present disclosure. As shown in FIG. 2, the data may be transmitted in parallel to the check module 20 through eight data selection modules 10. Each data selection module 10 transmits input/output data of one DQ port to the check module 20. For example, the first data selection module 10 transmits the input/output data of the first DQ port to the check module 20. For example, the second data selection module 10 transmits the input/output data of the second DQ port to the check module 20 . . . . The eighth data selection module 10 transmits the input/output data of the eighth DQ port to the check module 20.

Still referring to FIG. 2, parallel transmission may be performed between each data selection module 10 and the check module 20 by eight channels. The eighth to fifteenth bits of data transmitted by each data selection module (i.e., the first to eighth bits transmitted previously) are respectively transmitted in parallel to the check module 20 through eight data lines. After the eighth to fifteenth bits of data, the 0-th to seventh bits of data (i.e., the ninth to sixteenth bits transmitted later) are transmitted in parallel to the check module 20 through eight data lines. The 0-th bit of data and the eighth bit of data are serially transmitted through the first data line; the first bit of data and the ninth bit of data are serially transmitted through the second data line; . . . ; and the seventh bit of data and the fifteenth bit of data are serially transmitted through the eighth data line. Correspondingly, the eight data selection modules 10 may output 128 bits of data to the check module 20 within one data transmission cycle.

After the above data transmission process is described, the structure of the data selection module corresponding to the data transmission process is described next. It should be noted that, since the structures and functions of all the data selection modules are similar, one data selection module is described next in the embodiments of the present disclosure.

Figure 3:
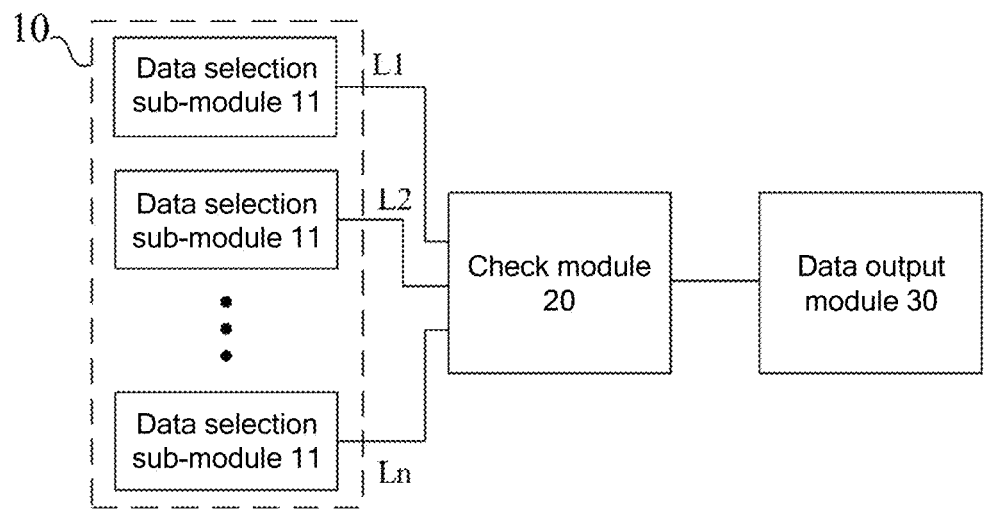
FIG. 3 is a schematic structural diagram of another data processing circuit according to one embodiment of the present disclosure.

Correspondingly, FIG. 3 is a schematic structural diagram of another data processing circuit according to one embodiment of the present disclosure. As shown in FIG. 3, the data selection module 10 may include n data selection sub-modules 11 arranged in parallel. The n data selection sub-modules 11 may be respectively connected to the check module 20, for example, respectively connected to the check module 20 through n data lines L1-Ln.

The i-th data selection sub-module 11 may be configured to output the i-th bit and the (i+n)-th bit of the received write data within each data transmission cycle if the write control command is in the first level state. For example, if each data transmission cycle includes a first period of time and a second period of time, the i-th bit may be transmitted within the first period of time, and the (i+n)-th bit may be transmitted within the second period of time.

The i-th bit and the (i+n)-th bit of the received read data within each data transmission cycle are outputted if the read control command is in the first level state.

Through this embodiment, if n is equal to 1, orderly data transmission between the data selection module 10 and the check module 20 may be achieved, thereby ensuring the accuracy of data transmission, and improving the reliability of data processing.

Moreover, if n is greater than 1, in this embodiment, n data lines may be configured to transmit data in parallel between the data selection module 10 and the check module 20 by n channels in a unit of the data transmission cycle, to achieve fast and orderly transmission of the write data and the read data, such that the write data or the read data can be transmitted to the check module 20 accurately and quickly, and the data transmission speed and processing efficiency of the data processing circuit can be improved.

It should be noted that, the data selection module 10 may also be implemented by other functional structures, to multiplex the write data inputted within the write cycle and the read data inputted within the read cycle into one signal and input into the check module, and select the input data of the check module through the control signal. If the write control command is in the first level state, the write data is selected and inputted into the check module; and if the read control command is in the first level state, the read data is selected and inputted into the check module. For example, the data selection module 10 may be one or more multiplexing modules, and each multiplexing module may include one or more multiplexers. This is not specifically limited.

After the data selection sub-module 11 is preliminarily introduced, the specific structure of the data selection sub-module is described next. Since the structures of the n data selection sub-modules 11 may be the same, the following takes the i-th data selection sub-module 11 as an example to describe each data selection sub-module.

Figure 4:
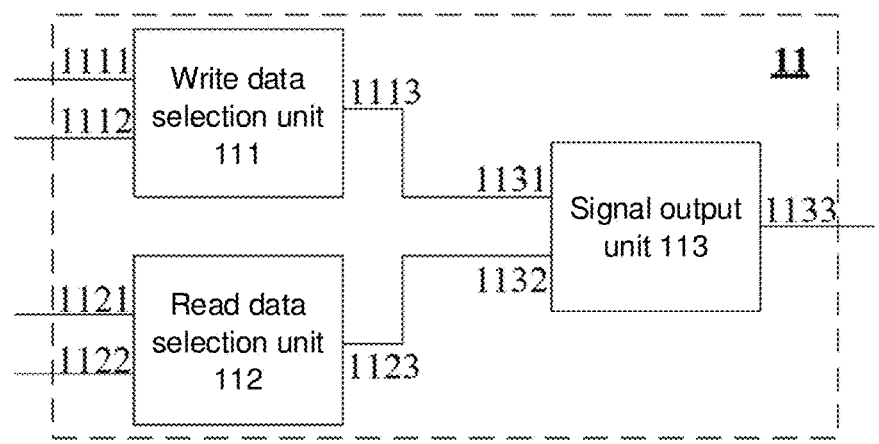
FIG. 4 is a schematic structural diagram of a data selection sub-module according to one embodiment of the present disclosure.

In one embodiment, FIG. 4 is a schematic structural diagram of a data selection sub-module according to one embodiment of the present disclosure. As shown in FIG. 4, the data selection sub-module 11 may include a write data selection unit 111, a read data selection unit 112, and a signal output unit 113. The write data selection unit 111 and the read data selection unit 112 are respectively connected to the signal output unit 113. Next, the respective constituent units are sequentially described.

The write data selection unit 111 may include a write data control terminal 1111, a write data input terminal 1112, and a write data output terminal 1113.

Specifically, in the i-th data selection sub-module 11, the write data control terminal 1111 may be configured to receive the write control command. The write data input terminal 1112 may be configured to receive the i-th write sub-data, where the i-th write sub-data is the i-th bit and the (i+n)-th bit of the write data transmitted within each data transmission cycle. The i-th write data selection unit 111 may be configured to output the i-th write sub-data at the write data output terminal 1113 in response to the write control command. For example, the write data selection unit 111 may be configured to generate a first pulse signal according to the i-th bit and the (i+n)-th bit of the write data transmitted within each data transmission cycle. The write data output terminal 1113 may be configured to output the first pulse signal.

The i-th write sub-data may be outputted if the write control command is in the first level state. For example, the i-th write sub-data may also be stopped outputting if the write control command is in the fourth level state. For example, a low level signal may be outputted if the write control command is in the fourth level state. For example, if the value of the i-th bit and the (i+n)-th bit of the i-th write sub-data is 1, it corresponds to a high level signal. Moreover, if the value of the i-th bit and the (i+n)-th bit is 0, it corresponds to the low level signal.

The read data selection unit 112 may include a read data control terminal 1121, a read data input terminal 1122, and a read data output terminal 1123.

Specifically, the read data control terminal 1121 may be configured to receive the read control command. The read data input terminal 1122 may be configured to receive the i-th read sub-data, where the i-th read sub-data is the i-th bit and the (i+n)-th bit of the read data transmitted within each data transmission cycle. The read data selection unit 112 may be configured to output the i-th read sub-data at the read data output terminal 1123 in response to the read control command. For example, the read data selection unit 112 may be configured to generate a second pulse signal according to the i-th bit and the (i+n)-th bit of the read data transmitted within each data transmission cycle. The read data output terminal 1123 may be configured to output the second pulse signal.

The read data may be outputted if the read control command is in the first level state. Optionally, is the low level signal may also be outputted if the read control command is in the fourth level state.

The signal output unit 113 may include a first input terminal 1131, a second input terminal 1132, and an output terminal 1133.

Specifically, the first input terminal 1131 is connected to the write data output terminal 1113. The second input terminal 1132 is connected to the read data output terminal 1123. The pulse signal output terminal 1133 may be configured to output the i-th write sub-data or the i-th read sub-data.

That is to say, the signal output unit 113 may select to output the read data within the read cycle (i.e., the data transmission cycle when the read control command is in the first level state) and select to output the write data within the write cycle (i.e., when the write control command is in the first level state).

It should be noted that the data selection sub-module 11 may also use other functional structures, for example, may be a multiplexing module. This is not specifically limited. For example, the multiplexing module may include one or more multiplexers.

In this embodiment, if the write control command is in the first level state, namely the write cycle, level signals at the i-th bit and the (i+n)-th bit of the write data transmitted within each data transmission cycle are outputted. Moreover, if the read control command is in the first level state, namely the read cycle, the i-th bit and the (i+n)-th bit of the read data transmitted within each data transmission cycle are outputted. Therefore, the i-th data selection sub-module may output the i-th bit and the (i+n)-th bit of the write data within the write cycle and output the i-th bit and the (i+n)-th bit of the read data within the read cycle, and n data selection sub-units arranged in parallel may sequentially output the read data outputted within the read cycle and the write data outputted within the write cycle into a same signal output unit 113 for processing, achieving the multiplexing of the read data and the write data at the data input terminals (including the write data input terminal 1112 and the read data input terminal 1122), and improving the efficiency of data processing.

Figure 5:
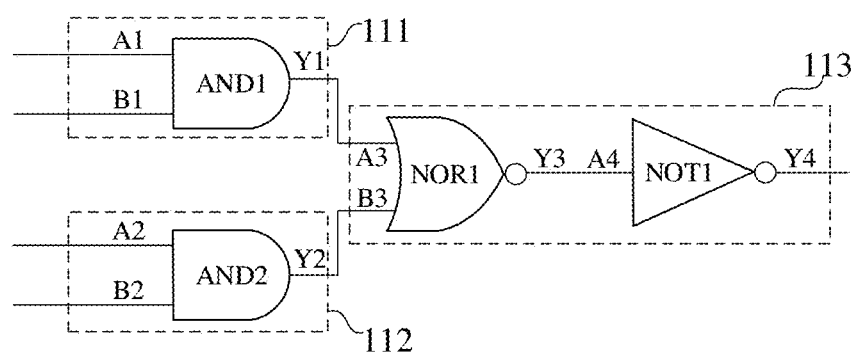
FIG. 5 is a schematic structural diagram of an exemplary data selection sub-module according to one embodiment of the present disclosure.

In one example, FIG. 5 is a schematic structural diagram of an exemplary data selection sub-module according to one embodiment of the present disclosure.

As shown in FIG. 5, the write data selection unit 111 may include a first AND gate AND1. The first AND gate AND1 includes a fifth input terminal B1, a sixth input terminal A1, and a third output terminal Y1. The fifth input terminal B1 is used as the write data input terminal 1112. The sixth input terminal A1 is used as the write data control terminal 1111. The third output terminal Y1 is used as the write data output terminal 1113.

The read data selection unit 112 may include a second AND gate AND2. The second AND gate AND2 includes a seventh input terminal B2, an eighth input terminal A2, and a fourth output terminal Y2. The seventh input terminal B2 is used as the read data input terminal 1122. The eighth input terminal A2 is used as the read data control terminal 1121. The fourth output terminal Y2 is used as the read data output terminal 1123.

The signal output unit 113 may include a NOR gate NOR1 and a NOT gate NOT1 connected to each other. The NOR gate NOR1 includes a ninth input terminal A3, a tenth input terminal B3, and a fifth output terminal Y3. The ninth input terminal A3 is used as the first input terminal 1131 of the signal output unit. The tenth input terminal B3 is used as the second input terminal 1132 of the signal output unit. The NOT gate NOT1 may include an eleventh input terminal A4 and a sixth output terminal Y4. The eleventh input terminal A4 is connected to the fifth output terminal Y3. The sixth output terminal Y4 is used as the output terminal 1133 of the signal output unit.

Figure 6A:
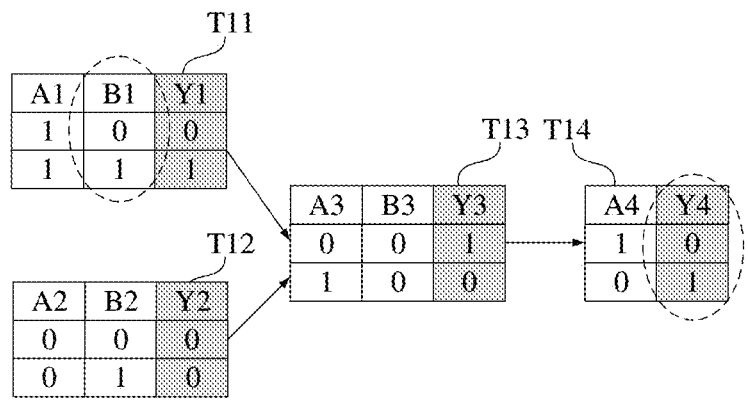
FIG. 6A is a schematic logic diagram when a data selection module is configured to transmit write data.
Figure 6B:
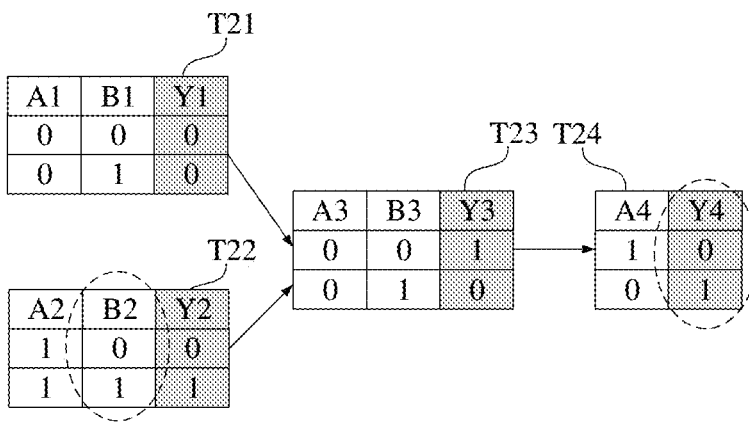
FIG. 6B is a schematic logic diagram when a data selection module is configured to transmit read data.

It should be noted that FIG. 6A is a schematic logic diagram when a data selection module is configured to transmit write data. FIG. 6B is a schematic logic diagram when a data selection module is configured to transmit read data. In FIG. 6A and FIG. 6B, the logic value "1" corresponds to a high level, and the logic value "0" corresponds to a low level. Next, the processing logic of the logic gate circuit shown in FIG. 5 is described with reference to FIG. 6A and FIG. 6B.

As shown in FIG. 6A, during the write cycle, the control logic of the first AND gate AND1 is shown in the truth table T11. Specifically, the write control command of the sixth input terminal A1 is kept in a high-level state, corresponding to the logic value "1". At this time, if the write data of the fifth input terminal B1 is 0, the third output terminal Y1 outputs the logic value "0". Moreover, if the write data of the fifth input terminal B1 is 1, the third output terminal Y1 outputs the logic value "1".

Moreover, during the write cycle, the control logic of the second AND gate AND2 is shown in the truth table T12. Specifically, the read control command and the write control command are mutually exclusive signals. If the write control command is kept in the high-level state, the read control command at the eighth input terminal A2 is kept in a low-level state, corresponding to the logic value "0". At this time, regardless of whether the read data of the seventh input terminal B2 is or 1, the logic value outputted by the fourth output terminal Y2 remains "0".

Moreover, during the write cycle, the control logic of the NOR gate NOR1 is shown in the truth table T13, and the control logic of the NOT gate NOT1 is shown in the truth table T14. At this time, the logic value of the ninth input terminal A3 is the write data 0 or 1, and the logic value of the tenth is input terminal B3 is 0. At this time, if the write data 0 is at the ninth input terminal A3, the fifth output terminal Y3 outputs the logic value 1. At this time, after inversion through the NOT gate NOT1, the write data 0 is outputted by the sixth output terminal Y4. Similarly, if the write data 1 is at the ninth input terminal A3, the fifth output terminal Y3 outputs the logic value 0. At this time, after inversion through the NOT gate NOT1, the write data 1 is outputted by the sixth output terminal Y4.

Moreover, as shown in FIG. 6B, during the read cycle, the control logic of the first AND gate AND1 is shown in the truth table T21. Specifically, the write control command of the sixth input terminal A1 is kept in the low-level state, corresponding to the logic value "0". At this time, regardless of whether the write data of the fifth input terminal B1 is 0 or 1, the third output terminal Y1 outputs the logic value "0".

Moreover, during the read cycle, the control logic of the second AND gate AND2 is shown in the truth table T22. Specifically, if the write control command is kept in the low-level state, the read control command at the eighth input terminal A2 is kept in the high-level state, corresponding to the logic value "1". At this time, if the read data of the seventh input terminal B2 is 0, the logic value outputted by the fourth output terminal Y2 is 0. If the read data of the seventh input terminal B2 is 1, the logic value outputted by the fourth output terminal Y2 is 1.

Moreover, during the read cycle, the control logic of the NOR gate NOR1 is shown in the truth table T23, and the control logic of the NOT gate NOT1 is shown in the truth table T24. At this time, the logic value of the ninth input terminal A3 is 0, and the logic value of the tenth input terminal B3 is the read data 0 or 1. At this time, if the read data 0 is at the tenth input terminal B3, the fifth output terminal Y3 outputs the logic value 1. After inversion through the NOT gate NOT1, the read data 0 is outputted by the sixth output terminal Y4. Similarly, if the read data 1 is at the tenth input terminal B3, the fifth output terminal Y3 outputs the logic value 0. After inversion through the NOT gate NOT1, the read data 1 is outputted by the sixth output terminal Y4.

In conclusion, during the write cycle, the write data is inputted into the data selection sub-module through the fifth input terminal B1. After a series of logic data processing, the write data may be outputted through the sixth output terminal Y4. Moreover, during the read cycle, the read data is inputted into the data selection sub-module through the seventh input terminal B2. After a series of logic data processing, the read data may be outputted through the sixth output terminal Y4.

Correspondingly, in this embodiment, the write data and the read data may be multiplexed at the data input terminals through the logic gate circuit. Since the area of the check module 20 is much larger than the volume of the logic gate circuit in the actual circuit, in the embodiments of the present disclosure, the write data and the read data may be transmitted to a same check module for processing in time periods by setting the logic gate circuit. The area of the semiconductor memory can be reduced.

It should be noted that, in the embodiments of the present disclosure, the function of the data selection sub-module may also be achieved by using other connecting modes of the logic gate device, which is not specifically limited.

Moreover, it should also be noted that, if within each data transmission cycle, more than 2 bits of data are transmitted through one line, such as 4 bits and 8 bits of data, each data selection sub-module 11 may also serially transmit more than 2 bits. The specific transmission mode is similar to the above transmission of 2 bits of data, and reference may be made to the specific description of the transmission of 2 bits data in the above part of the embodiments of the present disclosure, and details are not repeated herein.

After the data selection module 10 is introduced, the check module 20 is described next.

The check module 20 may be configured to receive the write data or the read data, check the write data or the read data, and obtain the write check data or the read check data, and output the write check data or the read check data.

The check module 20 may be configured to calculate check data for verifying the correctness of the data. In some embodiments, the check module 20 may be a cyclic redundancy check (CRC) module. For example, the CRC module may be called a CRC counter.

In one example, if the write control command is in the first level state, the check module 20 may receive the write data outputted by the data selection module 10, perform CRC calculation on the write data, and obtain a CRC code, and output the CRC code as write check data. For example, the check module 20 may calculate the 8-bit or 16-bit write check data after receiving the 128-bit write data of the eight data selection modules 10 transmitted within one data transmission cycle.

In another embodiment, if the read control command is in the first level state, the check module 20 may receive the read data outputted by the data selection module 10, perform CRC calculation on the read data, and obtain a CRC code, and output the calculated CRC code as the read check data.

In one embodiment, if one write data or one read data needs to be transmitted through one data transmission cycle, one check data may be calculated after each data transmission cycle. For example, for the 16-bit read data, if the check module receives the 16-bit read data within one data transmission cycle, check processing may be performed after receiving the 16-bit read data to obtain one read check data. The calculation process of the write data is similar to that of the read data, which will not be repeated herein.

Or, within each data transmission cycle, after receiving all the data transmitted by all the data selection modules, the check data corresponding to each data selection module may be calculated. For example, as shown in FIG. 2, within each data transmission cycle, one data selection module may transmit the 16-bit read data to the check module 20. The eight data selection modules 10 may transmit the 128-bit read data to the check module 20, and the check module may jointly calculate the 8-bit or 16-bit check data after receiving all the 128 bits of read data transmitted by the eight data selection modules 10, and allocate 1 or 2 bits of check data for the 16-bit data transmitted by each data selection module. The calculation process of the write data is similar to that of the read data, which will not be repeated herein.

Or, if one write data or one read data needs to be transmitted through a plurality of data transmission cycles, one check result may be calculated after the plurality of data transmission cycles. For example, if the 64-bit read data needs to be transmitted to the check module through four data transmission cycles in a manner that the 16-bit data is transmitted within each data transmission cycle, the check module may perform check processing after receiving the 64-bit read data through the four data transmission cycles to obtain the read check data. The calculation process of the write data is similar to that of the read data, which will not be repeated herein.

It should be noted that the calculation mode of real-time reception and real-time calculation may also be adopted, and the check calculation mode in the embodiments of the present disclosure is not specifically limited.

It should be noted that, in the embodiments of the present disclosure, other check modes other than CRC, such as error correcting code (ECC), parity check, and message-digest algorithm 5 (MD5) check, may also be adopted according to actual scenarios and specific requirements, which are not specifically limited.

In some embodiments, after the check module 20 receives the data sent by the data selection module within each data transmission cycle, since the data is transmitted in parallel through eight data lines, the check processing may be performed after the received data is converted into serial data by serial-to-parallel conversion at the input end of the check module 20.

After the check module 20 is introduced, the data output module 30 is described next.

The data output module 30 may be configured to receive the write check data or the read check data, output the write check data if the write control command is in the first level state, and output the read check data if the read control command is in the first level state. For example, the data output module 30 may receive and output the write check data if the write control command is in the first level state. Moreover, the read check data may be received and outputted if the read control command is in the first level state.

Figure 7:
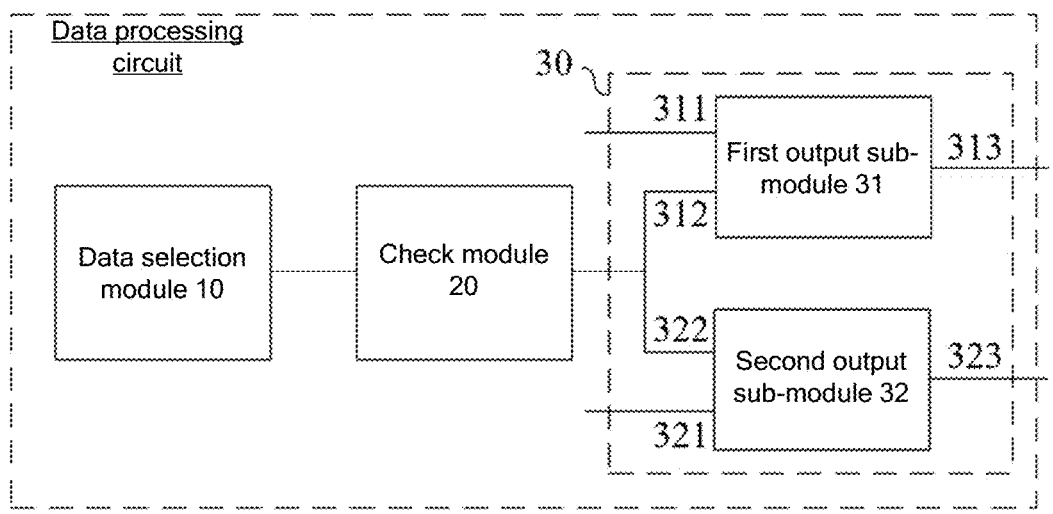
FIG. 7 is a schematic structural diagram of another data processing circuit according to one embodiment of the present disclosure.

In some embodiments, FIG. 7 is a schematic structural diagram of another data processing circuit according to one embodiment of the present disclosure. As shown in FIG. 7, the data output module 30 may include a first output sub-module 31 and a second output sub-module 32. The first output sub-module 31 and the second output sub-module 32 are respectively connected to the check module 20.

The first output sub-module 31 may include a write control terminal 311, a first check data input terminal 312, and a write check data output terminal 313. The write control terminal 311 may be configured to receive the write control command. The first check data input terminal 312 may be configured to receive the write check data or the read check data outputted by the check module 20. Specifically, the first check data input terminal 312 may receive the write check data outputted by the check module 20 if the write control command is in the first level state, and receive the read check data outputted by the check module 20 if the read control command is in the first level state. The write check data output terminal 313 may be configured to output the write check data if the write control command is in the first level state.

The second output sub-module 32 may include a read control terminal 321, a second check data input terminal 322, and a read check data output terminal 323. The read control terminal 321 may be configured to receive the read control command. The second check data input terminal 322 is connected to the first check data input terminal 312, and may be configured to receive the write check data or the read check data outputted by the check module 20. Specifically, the second check data input terminal 322 may receive the write check data outputted by the check module 20 if the write control command is in the first level state, and receive the read check data outputted by the check module 20 if the read control command is in the first level state. The read check data output terminal 323 may be configured to output the read check data if the read control command is in the first level state.

In this embodiment, according to the embodiments of the present disclosure, the write check data and the read check data processed and transmitted by a same check module 20 may be demultiplexed through the first output sub-module and the second output sub-module, and outputted through different output terminals (i.e., the write check data output terminal 313 and the read check data output terminal 323), such that it is convenient to perform different subsequent processing and use on the write check data and the read check data, thereby improving the performance of the data processing circuit.

It should be noted that, the data output module 30 in the embodiments of the present disclosure may also be other functional modules capable of separating or demultiplexing the sequentially transmitted write data and read data, which is not specifically limited.

Figure 8:
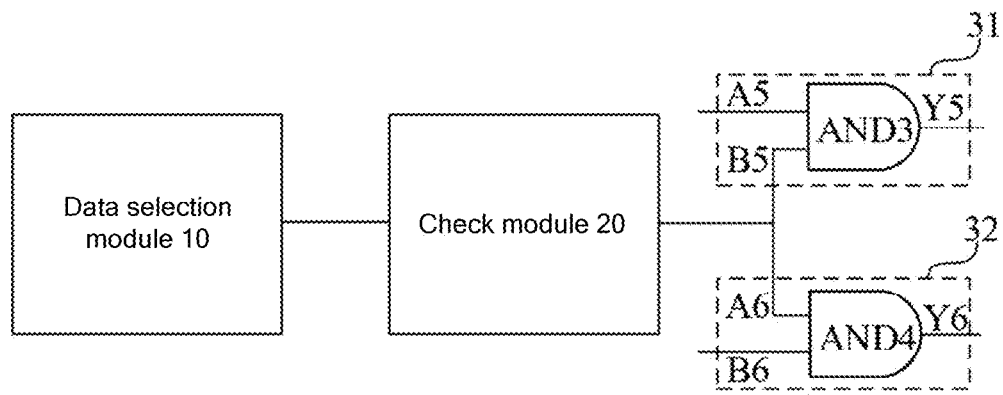
FIG. 8 is a schematic structural diagram of one exemplary data processing circuit according to one embodiment of the present disclosure.

In one embodiment, FIG. 8 is a schematic structural diagram of one exemplary data processing circuit according to one embodiment of the present disclosure.

As shown in FIG. 8, the first output sub-module 31 may include a third AND gate AND3. The third AND gate AND3 includes a twelfth input terminal B5, a thirteenth input terminal A5, and a seventh output terminal Y5. The twelfth input terminal B5 is used as the first check data input terminal 312, the thirteenth input terminal A5 is used as the write control terminal 311, and the seventh output terminal Y5 is used as the write check data output terminal 313.

The second output sub-module 32 may include a fourth AND gate AND4. The fourth AND gate AND4 includes a fourteenth input terminal B6, a fifteenth input terminal A6, and an eighth output terminal Y6. The fourteenth input terminal B6 is used as the second check data input terminal 322, the fifteenth input terminal A6 is used as the read control terminal 321, and the eighth output terminal Y6 is used as the read check data output terminal 323.

Figure 9A:
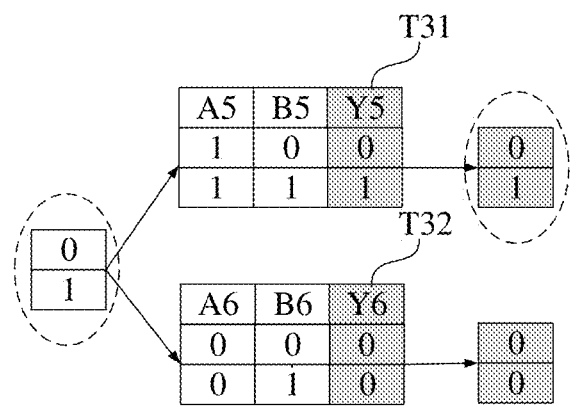
FIG. 9A is a schematic logic diagram when a data output module is configured to output write check data.
Figure 9B:
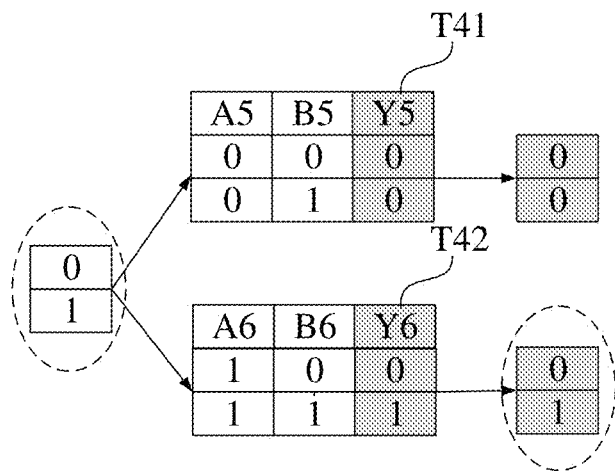
FIG. 9B is a schematic logic diagram when a data output module is configured to output read check data.

It should be noted that, FIG. 9A is a schematic logic diagram when a data output module is configured to output write check data. FIG. 9B is a schematic logic diagram when a data output module is configured to output read check data. In FIG. 9A and FIG. 9B, the logic value "1" corresponds to a high level, and the logic value "0" corresponds to a low level. Next, the processing logic of the logic gate circuit shown in FIG. 5 is described with reference to FIG. 9A and FIG. 9B.

As shown in FIG. 9A, during the write cycle, the control logic of the third AND gate AND3 is shown in the truth table T31. Specifically, the write control command of the thirteenth input terminal A5 is kept in the high-level state, corresponding to the logic value "1". The twelfth input terminal B5 receives the write check data. At this time, if the write check data is 0, the seventh output terminal Y5 outputs the logic value "0". Moreover, if the write check data is 1, the seventh output terminal Y5 outputs the logic value "1".

Moreover, the control logic of the fourth AND gate AND4 is shown in the truth table T32. Specifically, the read control command of the fifteenth input terminal A6 is kept in the low-level state, corresponding to the logic value "0". The fourteenth input terminal B6 receives the write check data. At this time, regardless of whether the write check data is 0 or 1, the logic value outputted by the eighth output terminal Y6 remains "0".

Moreover, as shown in FIG. 9B, during the read cycle, the control logic of the third AND gate AND3 is shown in the truth table T41. Specifically, the write control command of the thirteenth input terminal A5 is kept in the low-level state, corresponding to the logic value "0". The twelfth input terminal B5 receives the read check data. At this time, regardless of whether the read check data is or 1, the seventh output terminal Y5 outputs the logic value "0".

Moreover, the control logic of the fourth AND gate AND4 is shown in the truth table T42. Specifically, the read control command of the fifteenth input terminal A6 is kept in the high-level state, corresponding to the logic value "1". The fourteenth input terminal B6 receives the read check data. At this time, if the read check data is 0, the eighth output terminal Y6 outputs the logic value "0"; and if the read check data is 1, the eighth output terminal Y6 outputs the logic value "1".

In conclusion, during the write cycle, the check module 20 outputs the write check data to the twelfth input terminal B5 corresponding to the third AND gate AND3 and the fourteenth input terminal B6 corresponding to the fourth AND gate AND4. At this time, since the logic value of the thirteenth input terminal A5 corresponding to the third AND gate AND3 is 1, the write check data may be outputted from the seventh output terminal Y5 of the third AND gate. Moreover, during the write cycle, the check module 20 outputs the read check data to the twelfth input terminal B5 corresponding to the third AND gate AND3 and the fourteenth input terminal B6 corresponding to the fourth AND gate AND4. At this time, since the logic value of the fifteenth input terminal A6 corresponding to the fourth AND gate AND4 is 1, the write check data may be outputted from the eighth output terminal Y6 of the third AND gate.

Correspondingly, in this embodiment, the write check data and the read check data may be demultiplexed at the data output terminals through the logic gate circuit. Since the area of the check module 20 is much larger than the volume of the logic gate circuit in the actual circuit, in the embodiments of the present disclosure, the write check data and the read check data may be separated, by setting the logic gate circuit, from the data streams of the write check data and the read check data outputted by a same check module 20. The area of the semiconductor memory can be reduced.

It should be noted that, in the embodiments of the present disclosure, the function of the data selection sub-module may also be achieved by using other connecting modes of the logic gate device, which is not specifically limited.

For the data processing circuit shown in any of FIG. 1 to FIG. 9 in the embodiments of the present disclosure, if the write control command is in the first level state, after the write data is received by the data selection module 10, the write data may be sent to the check module 20 for checking, and the write check data obtained by checking is outputted by the data output module 30. Moreover, if the read control command is in the first level state, after the read data is received through the data selection module 10, the read data may be checked by using a same check module 20, and the read check data checked is outputted through the data output module 30. It is not necessary to check the write data and the read data respectively by using different data processing circuits, the write data or the read data may be selected for checking only through one data processing circuit according to the write control command and the read control command to generate the write check data or the read check data, and the write check data or the read check data are respectively outputted to different subsequent processing circuits through different output circuits under the control of the write control command and the read control command, thereby ensuring the reliability of data reading and writing while taking the size of the semiconductor memory into account.

Moreover, it should also be noted that, in the embodiments of the present disclosure, by using the write control command and the read control command, the output timing of the outputted write check data and read check data may be synchronized with the read and write sequence of the read data from the semiconductor memory, such that using one check module 20 may ensure the reliability of data reading and writing without affecting the efficiency of data reading and writing. The reliability of data reading and writing and the efficiency of reading and writing can be taken into account while reducing the area of the semiconductor memory, thereby improving the performance of the semiconductor memory.

In the process of data processing, the inventor also found that the sequence of the read data and the sequence of the write data may be wrong. For example, when reading the data from the semiconductor memory, if the reading sequence of the data is incorrect, the sequence of the read data may be wrong.

On this basis, the present disclosure further provides another data processing circuit. FIG. 10 is a schematic structural diagram of another data processing circuit according to one embodiment of the present disclosure. The embodiments of the present disclosure are optimized on the basis of the above embodiments, and the embodiments of the present disclosure may be combined with various optional solutions in one or more of the above embodiments.

The data processing circuit shown in FIG. 1 differs from the data processing circuit shown in FIG. 10 in that the data processing circuit shown in FIG. 10 may further include a sequence adjustment module 40. The data selection module 10 may be connected to the check module 20 through the sequence adjustment module 40. For example, if the number of data selection modules is r, r sequence adjustment modules 40 may be included. Each data selection module 10 is connected to the check module 20 through one sequence adjustment module 40. It should be noted that, since the sequence adjustment modules 40 are similar, the accompanying drawings and descriptions in the embodiments of the present disclosure only describe one data selection module 10 and the sequence adjustment module 40 connected thereto.

The sequence adjustment module 40 may be configured to receive the write data or the read data outputted by the data selection module 10, perform a data transmission sequence adjustment operation on the write data or the read data according to a sequence adjustment control signal, and adjust the write data or the read data to a correct transmission sequence and then output it. Specifically within the write cycle, the sequence adjustment module 40 may receive the write data transmitted by the data selection module 10, and adjust the write data to the correct transmission sequence and then output. Moreover, within the read cycle, the sequence adjustment module 40 may receive the read data transmitted by the data selection module 10, and adjust the read data to the correct transmission sequence and then output.

Correspondingly, if the data processing circuit further includes the sequence adjustment module 40, the check module 20 may be configured to: receive the write data adjusted to the correct transmission sequence or the read data adjusted to the correct transmission sequence, check the write data adjusted to the correct transmission sequence or the read data adjusted to the correct transmission sequence, and obtain write check data or read check data, and output the write check data or the read check data. It should be noted that, for other contents of the check module 20, reference may be made to the relevant descriptions in the above part of the embodiments of the present disclosure, which will not be repeated herein.

Next, the sequence adjustment module 40 is described through the sequence adjustment control signal, the data transmission sequence adjustment operation, and the specific structure of the sequence adjustment module 40.

The sequence adjustment control signal may be configured to indicate whether the transmission sequence of the data (the write data or the read data) received by the sequence adjustment module 40 is correct.

In some embodiments, the sequence adjustment control signal may be determined according to a value of a preset bit in a burst sequence field, where the preset bit is configured to represent whether the sequence of data reading is reversed. The preset bit may be a specific bit of the burst sequence field obtained by decoding the read and write commands.

In one embodiment, FIG. 11 is a schematic format diagram of read and write commands. As shown in FIG. 11, the burst sequence field may be a field corresponding to C0-C3. The preset bit may be C3.

Taking an example where one data selection module 10 transmits 16 bits of data 0-F in a correct order through eight data lines, if the bit C3 is 0, it means that the data transmission sequence is correct. That is, the 0-th bit of data to the seventh bit of data (i.e., 0-7 in FIG. 11) are first transmitted through eight data lines, and the eighth bit of data to the fifteenth bit of data (i.e., 8, 9, and A-F in FIG. 11) are transmitted later through eight data lines. Moreover, if the bit C3 is 1, it means that the data transmission sequence is reversed. That is, the eighth bit of data to the fifteenth bit of data are transmitted first, and the 0-th bit of data to the seventh bit of data are transmitted later.

Similarly, if the correct transmission sequence is high order first and low order later, the correct transmission sequence may be that the eighth bit of data to the fifteenth bit of data are transmitted first, and the 0-th bit of data to the seventh bit of data are transmitted later. This is not repeated herein.

After the sequence adjustment control signal is preliminarily introduced, the data transmission sequence adjustment operation is described next.

The data transmission sequence adjustment operation may refer to an operation capable of adjusting the data received by the sequence adjustment module 40 to the correct transmission sequence. For example, if the transmission sequence of the data received by the sequence adjustment module 40 is correct, the transmission sequence of the received data may be kept unchanged, and the received data is outputted to the subsequent check module 20. Additionally, for example, if the transmission sequence of the received data is wrong, the received data may be adjusted to the correct transmission sequence and then outputted to the subsequent check module 20.

In some embodiments, if the data selection module 10 uses one data line to transmit one channel of write data or read data within each data transmission cycle, the sequence adjustment module may adjust the data transmission sequence of a plurality of bit values in the channel of data.

In some other embodiments, if the data selection module 10 uses a plurality of data lines to transmit a plurality of channels of write data or read data within each data transmission cycle, the data selection module 10 may adjust the data transmission sequence of a plurality of bit values in each channel of data.

After the sequence adjustment control signal and the data transmission sequence adjustment operation are introduced, the specific structure of the sequence adjustment module 40 is described next.

In some embodiments, FIG. 12 is a schematic structural diagram of another data processing circuit according to one embodiment of the present disclosure. As shown in FIG. 12, if the data selection module 10 transmits 2n bits of write data or read data to the sequence adjustment module within one data transmission cycle through n data lines, the sequence adjustment module 40 includes n parallel sequence adjustment sub-modules 41. For the transmission mode of the n data lines, reference may be made to the relevant descriptions in the above part of the embodiments of the present disclosure in conjunction with FIG. 2, which will not be repeated herein.

Still referring to FIG. 12, each sequence adjustment sub-module 41 may be provided with a data input terminal 411, a first output terminal 412, and a second output terminal 413. Each data input terminal 411 is connected to the data selection module 10, and each first output terminal 412, and each second output terminal 413 are both connected to the check module 20.

Figure 13:
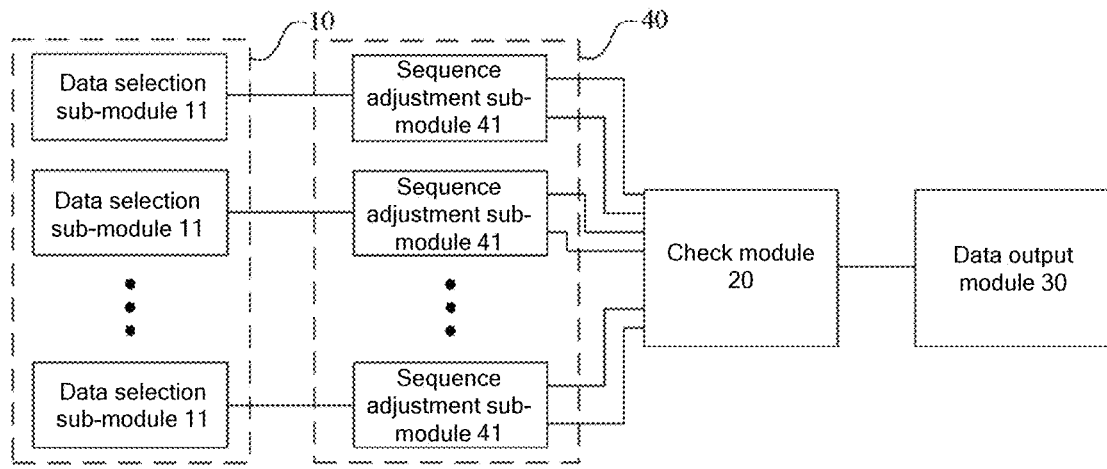
FIG. 13 is a schematic structural diagram of another data processing circuit according to one embodiment of the present disclosure.

In one embodiment, if the data selection module 10 includes n data selection sub-modules 11 arranged in parallel, FIG. 13 is a schematic structural diagram of another data processing circuit according to one embodiment of the present disclosure.

As shown in FIG. 13, if the data selection module 10 includes n data selection sub-modules 11 arranged in parallel, the n data selection sub-modules 11 arranged in parallel are connected in one-is to-one correspondence to the n sequence adjustment sub-modules 41 arranged in parallel. That is to say, the first data selection sub-module 11 is connected to the first sequence adjustment sub-module 41, the second data selection sub-module 11 is connected to the second sequence adjustment sub-module 41, . . . , and the n-th data selection sub-module 11 is connected to the n-th sequence adjustment sub-module 41.

Next, the sequence adjustment sub-module 41 is described in detail. Since the structures and functions of the n sequence adjustment sub-modules 41 may be the same, the following takes the i-th sequence adjustment sub-module 41 as an example to describe each sequence adjustment sub-module.

The data input terminal 411 of the i-th sequence adjustment sub-module 41 may be connected to the data selection module 10 for receiving the i-th bit and the (i+n)-th bit transmitted within each data transmission cycle. For example, the data input terminal 411 may be configured to receive the i-th bit and the (i+n)-th bit of the write data within the data transmission cycle for transmitting the write data, and receive the i-th bit and the (i+n)-th bit of the read data within the data transmission cycle for transmitting the read data. It should be noted that, the data input terminal 411 may be configured to sequentially receive the i-th bit and the (i+n)-th bit within each data transmission cycle. For example, each data transmission cycle may include a first period of time and a second period of time. The data input terminal 411 may be configured to receive the i-th bit in this data transmission cycle within the first period of time, and receive the (i+n)-th bit in this data transmission cycle within the second period of time.

The i-th sequence adjustment sub-module 41 may be configured to adjust the sequence of the i-th bit and the sequence of the (i+n)-th bit within each data transmission cycle to the correct transmission sequence. In one embodiment, if the sequence adjustment control signal indicates that the data transmission sequence is reversed, the i-th sequence adjustment sub-module 41 may exchange the sequence of the i-th bit and the sequence of the (i+n)-th bit, which are received within each data transmission cycle. That is to say, the i-th bit before adjustment is used as a new (i+n)-th bit, and the (i+n)-th bit before adjustment is used as a new i-th bit. For example, taking the data 0-F transmitted when n=8 as an example, one group of data is "0-7" and the other group of data is "8-F", then the data transmission sequence may be adjusted between the two sets of data. However, the transmission sequence of data within each group of data is not adjusted. In another embodiment, if the sequence adjustment control signal indicates that the data transmission sequence is correct, is the i-th sequence adjustment sub-module 41 may keep the sequence of the i-th bit and the sequence of the (i+n)-th bit, which are received within each data transmission cycle.

The first output terminal 412 and the second output terminal 413 of the i-th sequence adjustment sub-module 41 are respectively connected to the check module 20. The first output terminal 412 and the second output terminal 413 may be respectively configured to output, to the check module 20, the i-th bit adjusted to the correct transmission sequence and the (i+n)-th bit adjusted to the correct transmission sequence. In one embodiment, the first output terminal 412 is configured to output the i-th bit, and the second output terminal 413 is configured to output the (i+n)-th bit.

In this embodiment, if the data transmission sequence is reversed, the i-th sequence adjustment sub-module 41 may adjust the transmission sequence of the received i-th bit and the transmission sequence of the received (i+n)-th bit, output the adjusted i-th bit from the first output terminal 412, and output the adjusted (i+n)-th bit from the second output terminal 413, thereby ensuring the accuracy of the data received by the check module 20, and improving the reliability of data reading and writing.

Figure 14:
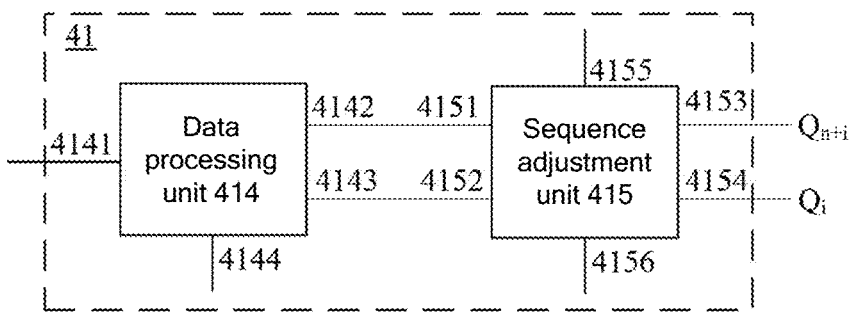
FIG. 14 is a structural schematic diagram of a sequence adjustment sub-unit according to one embodiment of the present disclosure.

In one embodiment, FIG. 14 is a structural schematic diagram of a sequence adjustment sub-unit according to one embodiment of the present disclosure. As shown in FIG. 14, the i-th sequence adjustment sub-module 41 may include a data processing unit 414 and a sequence adjustment unit 415.

The data processing unit 414 may be provided with an input terminal 4141, a first output terminal 4142, a second output terminal 4143, and a control terminal 4144.

The input terminal 4141 of the data processing unit is used as the data input terminal 411 of the i-th sequence adjustment sub-module, and may be configured to receive the i-th bit and the (i+n)-th bit serially transmitted within each data transmission cycle.

The control terminal 4144 of the data processing unit may be configured to receive a first clock signal. In response to control of the first clock signal, the data processing unit 414 may be configured to generate, according to the i-th bit and the (i+n)-th bit received serially, first transmission data and second transmission data transmitted in parallel. The first transmission data includes the (i+n)-th bit obtained by sampling at a second trigger edge of the first clock signal. The second transmission data includes the i-th bit obtained by sampling at the second trigger edge of the first clock signal. The first output terminal 4142 and the second output terminal 4143 of the data processing unit are is configured to output the first transmission data and the second transmission data in parallel. That is to say, if the first output terminal 4142 of the data processing unit outputs the first transmission data, the second output terminal 4143 of the data processing unit may simultaneously output the second transmission data.

For the first clock signal, the occurrence moment of the first trigger edge thereof may be later than or synchronized with the start transmission moment of the i-th bit and earlier than the end transmission moment of the i-th bit; and the occurrence moment of the second trigger edge thereof may be later than or synchronized with the start transmission moment of the (i+n)-th bit and earlier than the end transmission moment of the (i+n)-th bit. The start transmission moment of any bit is a moment at which the transmission of the bit is started, and the end transmission moment of any bit is a moment at which the transmission of the bit is stopped. For example, the trigger edge may be a rising edge or a falling edge.

Specifically, the first clock signal may correspond to a level trigger or an edge trigger. For example, when the first clock signal corresponds to the level trigger, if it is a high level trigger, the trigger edge is a rising edge. Correspondingly, the occurrence moment of the falling edge corresponding to the first trigger edge is earlier than the end transmission moment of the i-th bit, and the occurrence moment of the falling edge corresponding to the second trigger edge is earlier than the end transmission moment of the (i+n)-th bit. Additionally, for example, if it is a low level trigger, the trigger edge is a falling edge. Correspondingly, the occurrence moment of the rising edge corresponding to the first trigger edge is earlier than the end transmission moment of the i-th bit, and the occurrence moment of the rising edge corresponding to the second trigger edge is earlier than the end transmission moment of the (i+n)-th bit.

The sequence adjustment unit 415 may be provided with a first input terminal 4151, a second input terminal 4152, a first output terminal 4153, a second output terminal 4154, a first control terminal 4155, and a second control terminal 4156.

The first input terminal 4151 of the sequence adjustment unit is connected to the first output terminal 4142 of the data processing unit, and may be configured to receive the first transmission data. The second input terminal 4152 of the sequence adjustment unit is connected to the second output terminal 4143 of the data processing unit, and may be configured to receive the second transmission data. That is to say, when the first input terminal 4151 of the sequence adjustment unit receives the first transmission data, the second input terminal 4152 of the sequence adjustment unit simultaneously receives the second transmission data.

The first output terminal 4153 of the sequence adjustment unit is used as the first output terminal 412 of the i-th sequence adjustment sub-module. The second output terminal 4154 of the sequence adjustment unit is used as the second output terminal 413 of the i-th sequence adjustment sub-module. The first control terminal 4155 of the sequence adjustment unit may be configured to receive the sequence adjustment control signal. The second control terminal 4156 of the sequence adjustment unit may be configured to receive the second clock signal.

The sequence adjustment unit 415 may be configured to perform sequence adjustment on the first transmission data and the second transmission data according to the sequence adjustment control signal and the second clock signal.

In one example, if the sequence adjustment control signal indicates that the data transmission sequence is reversed, the sequence adjustment unit 415 may use the (i+n)-th bit in the first transmission data as a high-order bit data $Q_{n+i}$, and output same through the first output terminal 4153 of the sequence adjustment unit if the second clock signal is at a trigger level. Moreover, the sequence adjustment unit 415 may use the i-th bit in the second transmission data as a low-order bit data $Q_i$, and output same through the second output terminal 4154 of the sequence adjustment unit if the second clock signal is at the trigger level. It should be noted that, the high-order bit data $Q_{n+i}$ outputted by the i-th sequence adjustment unit 415 may be used as the (n+i−1)-th bit of data in the 0-th bit of data to the (2n−1)-th bit of data transmitted by the sequence adjustment module. The low-order bit data $Q_i$ outputted by the i-th sequence adjustment unit 415 may be used as the (i−1)-th bit of data in the 0-th bit of data to the (2n−1)-th bit of data transmitted by the sequence adjustment module. It should be noted that, in the embodiments of the present disclosure, the first output terminal 4153 may also be referred to as a high-order bit data output terminal (i.e., an output port for outputting the high-order bit data), and the second output terminal 4154 may also be referred to as a low-order bit data output terminal (i.e., an output port for outputting the low-order bit data).

For the second clock signal, the trigger level inversion moment of the second clock signal may be a moment at which the second clock signal is inverted from a non-trigger level to the trigger level. The trigger level may be a level at which the sequence adjustment module is triggered to perform a signal latch function. In one example, if the high level is latched, the trigger level may be a high level, and correspondingly, the non-trigger level is a low level. Similarly, if the low level is latched, the trigger level may be a low level, and correspondingly, the non-trigger level may be a high level.

Moreover, the trigger level inversion moment of the second clock signal may be aligned with the appearance moment of the second trigger edge of the first clock signal.

For example, if the second clock signal corresponds to the edge trigger, when the trigger level inversion moment of the second clock signal is later than the occurrence moment of the second trigger edge of the first clock signal, and the trigger level inversion moment of the second clock signal is earlier than the occurrence moment of the third trigger edge of the first clock signal, it may be determined that the trigger level inversion moment of the second clock signal is aligned with the appearance moment of the second trigger edge of the first clock signal.

It should be noted that, in this embodiment, the trigger level inversion moment of the second clock signal is later than the occurrence moment of the second trigger edge of the first clock signal, thereby avoiding avoids the influence of the transmission delay on the data reading in the actual circuit transmission process, such that it can be ensured that the data when the first transmission data and the second transmission data are at the trigger level can be accurately read by using the second clock signal, thereby improving the accuracy of data processing.

Additionally, for example, if the second clock signal corresponds to the level trigger, when the occurrence moment of the second trigger edge of the first clock signal is within the duration of the trigger level of the second clock signal, it may be determined that the trigger level inversion moment of the second clock signal is aligned with the appearance moment of the second trigger edge of the first clock signal. For example, the trigger level inversion moment of the second clock signal may be earlier than, equal to or later than the appearance moment of the second trigger edge of the first clock signal, and earlier than the occurrence time of the third trigger edge of the first clock signal.

In another example, if the sequence adjustment control signal indicates that the data transmission sequence is correct, the sequence adjustment unit 415 may use the i-th bit in the second transmission data as the high-order bit data $Q_{n+i}$, and output same through the first output terminal 4153 of the sequence adjustment unit if the second clock signal is at the trigger level. Moreover, the sequence adjustment unit 415 may use the (i+n)-th bit in the first transmission data as the low-order bit data $Q_i$, and output same through the second bit output terminal 4154 of the sequence adjustment unit if the second clock signal is at the trigger level. It should be noted that, for the relevant contents of the high-order bit data $Q_{n+i}$ and the low-order bit data $Q_i$ outputted by the sequence adjustment unit 415, reference may be made to the relevant descriptions in the above part of the embodiments of the present disclosure, which will not be repeated herein.

In this embodiment, the first transmission data and the second transmission data transmitted in parallel may be generated through the data processing unit 414. Since the (i+n)-th bit of the first transmission data is transmitted at the second trigger edge of the first clock signal, and the i-th bit of the second transmission data is transmitted at the second trigger edge of the first clock signal, the sequence adjustment unit 415 may simultaneously receive the i-th bit and the (i+n)-th bit transmitted in parallel. The i-th bit and the (i+n)-th bit can be flexibly adjusted by adjusting the output ports of the i-th bit and the (i+n)-th bit that are transmitted in parallel, thereby improving the transmission accuracy of the write data and the read data.

Figure 15:
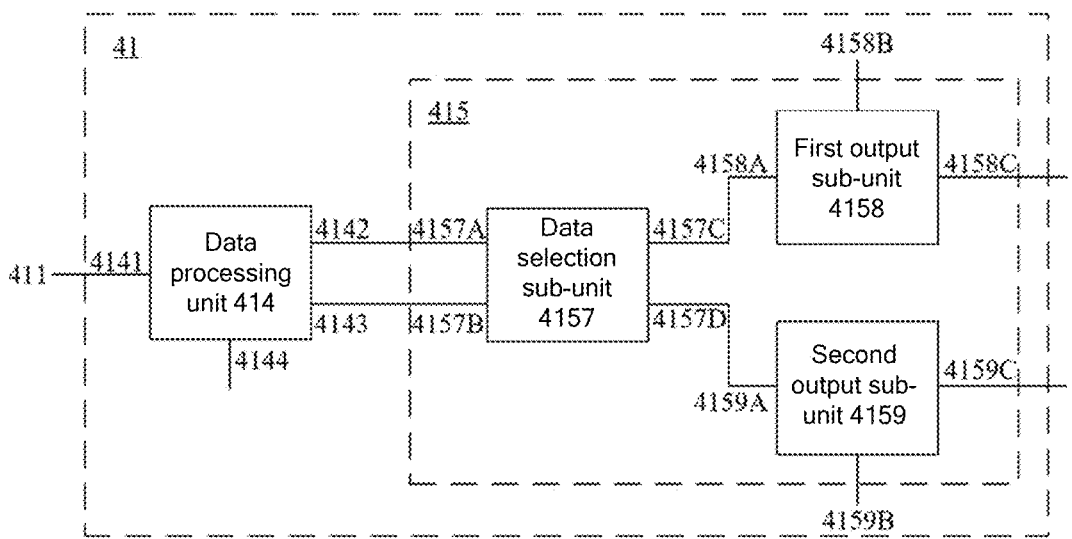
FIG. 15 is a structural schematic diagram of a sequence adjustment unit according to one embodiment of the present disclosure.

In one example, FIG. 15 is a structural schematic diagram of a sequence adjustment unit according to one embodiment of the present disclosure. As shown in FIG. 15, the sequence adjustment unit 415 may include a data selection sub-unit 4157, a first output sub-unit 4158, and a second output sub-unit 4159.

The data selection sub-unit 4157 may be provided with a first input terminal 4157A, a second input terminal 4157B, a first output terminal 4157C, and a second output terminal 4157D. The first input terminal 4157A of the data selection sub-unit is used as the first input terminal 4151 of the sequence adjustment unit, and may be configured to acquire the first transmission data. The second input terminal 4157B of the data selection sub-unit is used as the first input terminal 4152 of the sequence adjustment unit, and may be configured to acquire the second transmission data. The data selection sub-unit 4157 may be configured to selectively output the first transmission data and the second transmission data at the corresponding output terminal according to the sequence adjustment control signal. If the sequence adjustment control signal indicates that the data transmission sequence is reversed, the first transmission data is outputted at the first output terminal 4157C, and the second transmission data is outputted at the second output terminal 4157D. If the sequence adjustment control signal indicates that the data transmission sequence is correct, the second transmission data is outputted at the first output terminal 4157C, and the first transmission data is outputted at the second output terminal 4157D.

The first output sub-unit 4158 may include an input terminal 4158A, a control terminal 41588, and an output terminal 4158C. The input terminal 4158A of the first output sub-unit is connected to the first output terminal 4157C of the data selection sub-unit, and may be configured to receive the transmission data selectively outputted at the first output terminal 4157C of the data selection sub-unit. The control terminal 4158B of the first output sub-unit may be configured to receive the second is clock signal. The output terminal 4158C of the first output sub-unit is used as the first output terminal 4153 of the sequence adjustment unit. The first output sub-unit 4158 may be configured to output, through the output terminal 4158C of the first output sub-unit, the transmission data received by the input terminal 4158A of the first output sub-unit if the second clock signal is at the trigger level.

The second output sub-unit 4159 may include an input terminal 4159A, a control terminal 41598, and an output terminal 4159C. The input terminal 4159A of the second output sub-unit is connected to the second output terminal 4157D of the data selection sub-unit. The control terminal 41598 of the second output sub-unit is configured to receive the second clock signal, and for example, may receive the second clock signal by connecting the control terminal 4159B of the second output sub-unit to the control terminal 4158B of the first output sub-unit. The output terminal 4159C of the second output sub-unit is used as the second output terminal 4154 of the sequence adjustment unit. The second output sub-unit 4159 is configured to output, through the output terminal 4159C of the second output sub-unit, the transmission data received by the input terminal 4159A of the second output sub-unit if the second clock signal is at the trigger level.

The sequence adjustment control signal may be determined according to the value of the preset bit in the burst sequence field, the preset bit is configured to represent whether the data transmission sequence is reversed, and the burst sequence field is obtained by decoding the read and write commands. It should be noted that, for the sequence adjustment control signal, reference may be made to the relevant descriptions in the above part of the embodiments of the present disclosure, which will not be repeated herein.

Through the embodiments of the present disclosure, the first transmission data and the second transmission data may be transmitted to the corresponding output sub-units through the data selection sub-unit according to whether the data is reversed, and the first output sub-unit and the second output sub-unit output, at a same trigger moment under the control of the second clock signal, the bit data which is adjusted to the correct output sequence, thereby achieving correct parallel output of the bit data, and improving the accuracy of data transmission.

Figure 16:
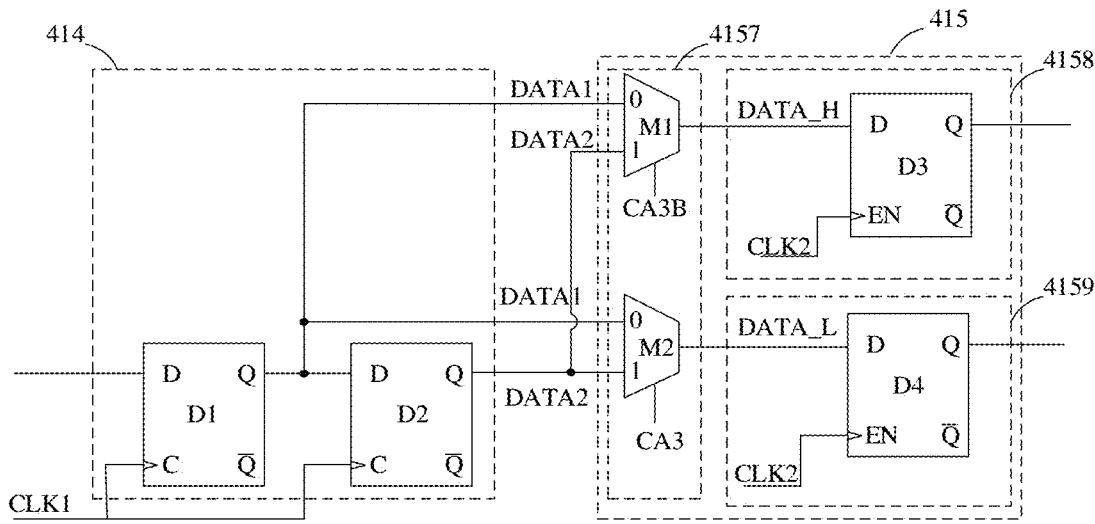
FIG. 16 is a schematic structural diagram of an exemplary sequence adjustment module according to one embodiment of the present disclosure.

In one optional example, FIG. 16 is a schematic structural diagram of an exemplary sequence adjustment module according to one embodiment of the present disclosure. As shown in FIG. 16, the data processing unit 414 may include a first D flip-flop D1 and a second D flip-flop D2.

The first D flip-flop D1 may be provided with a third input terminal (a port D of the first D flip-flop D1), a third in-phase output terminal (a port Q of the first D flip-flop D1), a third inverting output is terminal (a port $\overline{Q}$ of the first D flip-flop D1), and a fifth control terminal (a port C of the first D flip-flop D1).

The third input terminal is used as the input terminal of the data processing unit 414, and may be configured to receive the i-th bit and the (i+n)-th bit serially transmitted within each data transmission cycle. The fifth control terminal may be configured to receive the first clock signal CLK1. The third in-phase output terminal is used as the first output terminal 4142 of the data processing unit, and may be configured to output the first transmission data DATA1. For example, the first D flip-flop D1 may be configured to adjust the i-th bit within each data transmission cycle to the first trigger edge of the first clock signal CLK1 for transmission, and adjust the (i+n)-th bit within each data transmission cycle to the second trigger edge of the first clock signal for transmission to obtain the first transmission data DATA1.

The second D flip-flop D2 may be provided with a fourth input terminal (a port D of the second D flip-flop D2), a fourth in-phase output terminal (a port Q of the second D flip-flop D2), a fourth inverting output terminal (a port $\overline{Q}$ of the second D flip-flop D2), and a sixth control terminal (a port C of the second D flip-flop D2). The fourth input terminal is connected to the third in-phase output terminal, and may be configured to receive the first transmission data DATA1. The sixth control terminal is connected to the fifth control terminal, and may be configured to receive the first clock signal CLK1. The fourth in-phase output terminal is used as the second output terminal 4143 of the data processing unit, and may be configured to output the second transmission data DATA2. For example, the second D flip-flop D2 may be configured to delay the i-th bit in the first transmission data DATA1 from the first trigger edge of the first clock signal to the second trigger edge of the first clock signal for transmission, and delay the (i+n)-th bit in the first transmission data from the second trigger edge of the first clock signal to the third trigger edge of the first clock signal for transmission to obtain the second transmission data DATA2.

It should be noted that, the D flip-flop may output the data of the port D to the output terminal Q if the input clock signal is at the trigger edge. For the first D flip-flop D1 in this embodiment, if the first clock signal CLK1 is located at the first trigger edge, the i-th bit received at the port D may be transmitted to the output terminal Q; and if the first clock signal CLK1 is at the second trigger edge, the (i+n)-th bit received at the port D may be transmitted to the output terminal Q. That is to say, for the first transmission data DATA1 outputted by the output terminal Q of the first D flip-flop D1, the i-th bit is within the first time of period between the appearance moment of the first trigger edge of the first clock signal and the appearance moment of the second trigger edge, and the (i+n)-th bit is within the second time of period between the appearance moment of the second trigger edge and the appearance moment of the third trigger edge.

Moreover, for the second D flip-flop D2, since there is a certain transmission delay between the first D flip-flop D1 and the second D flip-flop D2, if the first clock signal CLK1 is at the second trigger edge, the data of the port D of the second D flip-flop D2 is still the i-th bit, and at this time, the i-th bit may be transmitted to the output terminal Q of the second D flip-flop D2; and, if the first clock signal CLK1 is at the third trigger edge, the data of the port D of the second D flip-flop D2 is still the (i+n)-th bit, and at this time, the (i+n)-th bit may be transmitted to the output terminal Q of the second D flip-flop D2. That is to say, for the second transmission data DATA2 outputted by the output terminal Q of the second D flip-flop D2, the i-th bit is within the second time of period between the appearance moment of the second trigger edge of the first clock signal and the appearance moment of the third trigger edge, and the (i+n)-th bit is within the third time of period between the appearance moment of the second trigger edge and the appearance moment of the third trigger edge.

It should be noted that, other circuit modes capable of implementing parallel transmission of the i-th bit and the (i+n)-th bit as two pieces of data may also be adopted in the embodiments of the present disclosure, which are not specifically limited.

Through this embodiment, the i-th bit and the (i+n)-th bit transmitted within each data transmission cycle may be adjusted, using the first D flip-flop D1 and the second D flip-flop D2 connected in series, from serial transmission to two channels of data transmitted in parallel within a period of time before the arrival of the third trigger edge after the second trigger edge of the first clock signal. Since the first D flip-flop D1 and the second D flip-flop D2 are logic devices, the accuracy of data processing is ensured while ensuring the integration of the semiconductor memory.

In one optional example, the sequence adjustment control signal may include a first control sub-signal CA3B and a second control sub-signal CA3. The first control sub-signal CA3B and the second control sub-signal CA3 may be mutually inverse signals.

For example, FIG. 17 is a schematic diagram of signal and data transmission timing involved in an exemplary sequence adjustment circuit according to one embodiment of the present disclosure. As shown in FIG. 17, if the data transmission sequence is reversed, for example, as shown by the first control sub-signal CA3B and the second control sub-signal CA3 corresponding to the first read cycle, the first control sub-signal CA3B is in the low-level state and the second control sub-signal CA3 is in the high-level state. If the data transmission sequence is correct, for example, as shown by the first control sub-signal CA3B and the second control sub-signal CA3 corresponding to the write cycle or the second read cycle, the first control sub-signal CA3B is in the high-level state and the second control sub-signal CA3 is in the low-level state.

The data selection sub-unit 5156 may include a first data selector M1 and a second data selector M2.

The first data selector M1 may include a first data input terminal (corresponding to a port 0), a second data input terminal (corresponding to a port 1), a first control terminal, and a first selection output terminal. The first data input terminal is connected to the third data input terminal (corresponding to a port 0) of the second data selector M2, is used as the first input terminal 4157A of the data selection sub-unit, and may be configured to receive the first transmission data DATA1. The second data input terminal is connected to the fourth data input terminal (corresponding to a port 1) of the second data selector M2, is used as the second input terminal 4157B of the data selection sub-unit, and may be configured to receive the second transmission data DATA2. The first control terminal may be configured to receive the first control sub-signal CA3B. The first selection output terminal is used as the first output terminal, and may be configured to output the first transmission data DATA1 if the first control sub-signal is in the second level state and output the second transmission data DATA2 if the first control sub-signal is in the third level state. For example, as shown in FIG. 16, if the first data input terminal corresponds to the port 0, in the low-level state, the first data input terminal is connected to the first selection output terminal, and at this time, the second level state is a low level, and the third level state is a high level. Additionally, for example, if the first data input terminal corresponds to the port 1, in the high-level state, the first data input terminal may be connected to the first selection output terminal, and at this time, the second level state is a high level, and the third level state is a low level.

The second data selector M2 may include a third data input terminal (corresponding to a port a fourth data input terminal (corresponding to a port 1), a second control terminal, and a second selection output terminal. The third data input terminal may be configured to receive the first transmission data DATA1. The fourth data input terminal may be configured to receive the second transmission data DATA2. The second control terminal may be configured to receive the second control sub-signal CA3. The second selection output terminal is used as the second output terminal, and may be configured to output the first transmission data DATA1 if the second control sub-signal CA3 is in the second level state and output the second transmission data DATA2 if the second control sub-signal CA3 is in the third level state. It should be noted that, for the specific content of the second data selector M1, reference may be made to the relevant description of the first data selector, which will not be repeated herein.

In this embodiment, still referring to FIG. 17, if the data transmission sequence is reversed, the second control sub-signal CA3 is in the high-level state (the third level state), the second data selector M2 outputs the second transmission data DATA2, and the first control sub-signal CA3B is in the low-level state (the second level state), the first data selector M1 outputs the first transmission data DATA1. Moreover, if the data transmission sequence is correct, the second control sub-signal CA3 is in the low-level state (the second level state), the second data selector M2 outputs the first transmission data DATA1, and the first control sub-signal CA3B is in the high-level state (the third level state), the first data selector M1 outputs the second transmission data DATA2.

It should be noted that, in the embodiments of the present disclosure, the above functions may also be achieved by using other devices having a data selection function, which will not be repeated.

In this embodiment, under the control of the two sequence adjustment control signals, namely the first control sub-signal and the second control sub-signal, the two data selectors selectively output the first transmission data and the second transmission data respectively, and the first transmission data and the second transmission data may be flexibly selected to output at the corresponding output terminals according to whether the transmission data is reversed, thereby improving the flexibility of data adjustment. Due to the small volume and area of the data selectors, the integration of the semiconductor memory is ensured.

In one optional example, still referring to FIG. 16, the first output sub-unit 4158 may include a first latch D3.

The first latch D3 may be provided with a first input terminal (a port D of the first latch D3), a first in-phase output terminal (a port Q of the first latch D3), a first inverting output terminal (a port 1:1 of the first latch D3), and a third control terminal (a port EN of the first latch D3). The first input terminal is used as the input terminal 4158A of the first output sub-unit. The third control terminal is used as the control terminal 4158B of the first output sub-unit, and the first in-phase output terminal is used as the output terminal 4158B of the first output sub-unit.

For example, the first latch D3 may be implemented as an edge D flip-flop. Or, the first latch D3 may also be implemented as a level D flip-flop. It should be noted that, the first latch D3 may also be implemented as other devices having a latch function, which is not specifically limited.

It should be noted that, since the third control terminal may be configured to receive the second clock signal, and the first input terminal receives the second transmission data DATA2 if the data transmission sequence is correct, the i-th data in the second transmission data DATA2 may be latched through the second clock signal; and since the data outputted by the first in-phase output terminal is the i-th bit, the latched i-th bit may still be regarded as the i-th bit at this time. The first input terminal receives the first transmission data DATA1 if the data transmission sequence is reversed, the (i+1)-th data in the first transmission data DATA1 may be latched at this time, and the latched (i+1)-th bit may be regarded as a new i-th bit at this time.

In one optional example, still referring to FIG. 16, the second output sub-unit 4159 may include a second latch D4.

The second latch D4 may be provided with a second input terminal (a port D of the second latch D4), a second in-phase output terminal (a port Q of the second latch D4), a second inverting output terminal (a port 1 of the second latch D4), and a fourth control terminal (a port EN of the second latch D4). The second input terminal is used as the input terminal 4159A of the second output sub-unit, the fourth control terminal is used as the control terminal 41596 of the second output sub-unit, and the second in-phase output terminal is used as the output terminal 4159C of the second output sub-unit.

It should be noted that, the specific implementation mode of the second latch D4 and the specific implementation mode of the first latch D3 are similar, and reference may be made to the relevant description of the first latch D3 in the above part of the embodiments of the present disclosure, which will not be repeated herein.

It should be noted that, since the fourth control terminal may be configured to receive the second clock signal, and the second input terminal receives the first transmission data DATA1 if the data transmission sequence is correct, the (i+n)-th data in the first transmission data DATA1 may be latched through the second clock signal; and since the data outputted by the second in-phase output terminal is the (i+n)-th bit, the latched (i+n)-th bit may still be regarded as the (i+n)-th bit at this time. The first input terminal receives the second transmission data DATA2 if the data transmission sequence is reversed, the i-th data in the second transmission data DATA2 may be latched at this time, and the latched i-th bit may be regarded as a new (i+n)-th bit at this time.

Through the above two embodiments, if the second clock signal is at the trigger level, the first is latch D3 and the second latch D4 are configured to simultaneously latch and output the first transmission data and the second transmission data which are adjusted to a normal sequence and are transmitted in parallel after the second trigger edge of the first clock signal, thereby ensuring accurate transmission of the data to be checked.

For ease of understanding, the sequence adjustment module shown in FIG. 16 is described as a whole next with reference to FIG. 17. The correct transmission sequence of the 16-bit data is set in advance to transmit the eighth to fifteenth bits of data first.

As shown in FIG. 17, within the first read cycle and the second read cycle, the read control command RD_EN is at a high level (the first level state), and the write control command WR_EN is at a low level (the fourth level state). Moreover, within the write cycle, the read control command RD_EN is at a low level, and the write control command WREN is at a high level.

Within the first read cycle in which the data transmission sequence is wrong, the data DATA0 received by the sequence adjustment module includes the 0-th to seventh bits of data transmitted in parallel first, and the eighth to fifteenth bits of data transmitted in parallel later. At this time, the eight first D flip-flops D1 may be configured to modulate and output the first transmission data DATA1 on the basis of the input data DATA0 under the control of the first clock signal CLK1. The first transmission data DATA1 includes the 0-th to seventh bits of data transmitted in parallel from the first trigger edge of the first clock signal, and the eighth to fifteenth bits of data transmitted in parallel from the second trigger edge of the first clock signal. The eight second D flip-flops D2 may be configured to modulate and output the second transmission data DATA2 on the basis of the first transmission data DATA1 under the control of the first clock signal CLK1. The second transmission data DATA2 includes the 0-th to seventh bits of data transmitted in parallel from the second trigger edge of the first clock signal, and the eighth to fifteenth bits of data transmitted in parallel from the third trigger edge of the first clock signal.

At this time, if the first control sub-signal CA3B is at a low level (the second level state) and the second control sub-signal CA3 is at a high level (the third level state), the first transmission data DATA1 may be regarded as first selected data DATA_H, and the second transmission data DATA2 may be regarded as second selected data DATA_L through the eight first data selectors M1 and the eight second data selectors M2.

If the second clock signal is at a high level (the trigger level), the bit data in the first selected data DATA_H may be outputted through the eight first latches D3 as the eighth to fifteenth bits of is data. For example, for the first latch D3 in the i-th sequence adjustment sub-module 41, the first selected data DATA_H received is the (i+n)-th bit if the second clock signal is at a high level, and correspondingly, the first latch D3 in the i-th sequence adjustment sub-module 41 outputs the (i+n)-th bit.

If the second clock signal is at a high level (the trigger level), the bit data in the second selected data DATA_L may be outputted through the eight second latches D4 as the 0-th to seventh bits of data. For example, for the second latch D4 in the i-th sequence adjustment sub-module 41, the second selected data DATA_L received is the i-th bit if the second clock signal is at a high level, and correspondingly, the second latch D4 in the i-th sequence adjustment sub-module 41 outputs the i-th bit.

Correspondingly, the correctly adjusted data DATA3 may be obtained through the eight first latches D3 and the second latches D4, and the correctly adjusted data DATA3 may be inputted into the CRC module to obtain the read check data CRC CODE.

Within the second read cycle in which the data transmission sequence is correct, the data DATA0 received by the sequence adjustment module includes the eighth to fifteenth bits of data transmitted in parallel first, and the 0-th to seventh bits of data transmitted in parallel later. At this time, the eight first D flip-flops D1 may be configured to modulate and output the first transmission data DATA1 on the basis of the input data DATA0 under the control of the first clock signal CLK1. The first transmission data DATA1 includes the eighth to fifteenth bits of data transmitted in parallel from the first trigger edge of the first clock signal, and the 0-th to seventh bits of data transmitted in parallel from the second trigger edge of the first clock signal. The eight second D flip-flops D2 may be configured to modulate and output the second transmission data DATA2 on the basis of the first transmission data DATA1 under the control of the first clock signal CLK1. The second transmission data DATA2 includes the eighth to fifteenth bits of data transmitted in parallel from the second trigger edge of the first clock signal, and the 0-th to seventh bits of data transmitted in parallel from the third trigger edge of the first clock signal.

At this time, if the first control sub-signal CA3B is at a low level (the third level state) and the second control sub-signal CA3 is at a high level (the second level state), the second transmission data DATA2 may be regarded as the first selected data DATA_H, and the first transmission data DATA1 may be regarded as the second selected data DATA_L through the eight first data selectors M1 and the eight second data selectors.

If the second clock signal is at a high level (the trigger level), the first selected data DATA_H, namely the fifteenth to eighth bits of data may be outputted through the eight first latches D3. Moreover, if the second clock signal is at a high level (the trigger level), the second selected data DATA_L, namely the 0-th to seventh bits of data, may be outputted through the eight second latches D4. It should be noted that, for the first latch D3 and the second latch D4, reference may be made to the relevant descriptions in the above part of the embodiments of the present disclosure, which will not be repeated herein.

Correspondingly, the correctly adjusted data DATA3 may be obtained through the eight first latches D3 and the second latches D4, and the correctly adjusted data DATA3 may be inputted into the CRC module to obtain the read check data CRC CODE.

It should be noted that, the processing principle of the write cycle is similar to that of the second read cycle, which will not be repeated herein.

In the embodiments of the present disclosure, according to the data processing circuit shown in FIG. 10 to FIG. 17, the sequence adjustment module may perform the data transmission sequence adjustment operation on the write data or the read data according to the sequence adjustment control signal before the read data or the write data is inputted into the sequence adjustment module, adjust the write data or the read data to the correct transmission sequence, and then input the write data or the read data into the check module, thereby ensuring the correctness of the write data or the read data inputted into the check module. Thus, the correctness of the outputted write check data or read check data may be improved, and the reliability of data reading and writing may be further improved.

In some embodiments, the data processing circuit provided in the embodiments of the present disclosure may also include a signal splicing module 50. The signal splicing module 50 is connected to the data output module 30.

Figure 18:
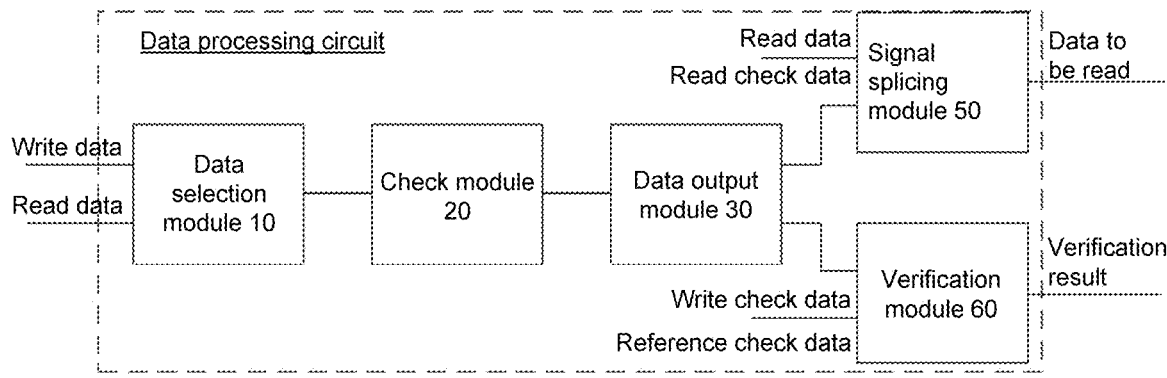
FIG. 18 is a schematic structural diagram of another data processing circuit according to one embodiment of the present disclosure.

FIG. 18 is a schematic structural diagram of another data processing circuit according to one embodiment of the present disclosure. As shown in FIG. 18, the signal splicing module 50 may be configured to acquire the read check data outputted by the data output module 30 and the read data, splice the read check data and the read data to obtain data to be read, and output the data to be read. Optionally, the data to be read is transmitted to the controller of the semiconductor memory. For example, after the controller of the semiconductor memory receives the data to be read, the data to be read may be separated into two parts, namely the read data and the read check data, is and the read check data is configured to check the correctness of the read data.

Through this embodiment, when data correctness checking needs to be performed in the subsequent process, the mode of using the check data and the read data as the data to be read may be configured to check the read data on the basis of the read check data in the data to be read, thereby improving the convenience and accuracy of checking.

In some embodiments, the data processing circuit provided in the embodiments of the present disclosure may also include a verification module 60. The verification module 60 is connected to the data output module 30.

FIG. 18 is a schematic structural diagram of another data processing circuit according to one embodiment of the present disclosure. Referring to FIG. 18, the verification module 60 may be configured to acquire write check data outputted by the data output module 30 and reference check data of the write data, and compare the write check data with the reference check data to obtain a verification result of the write data.

For example, the data to be written acquired from the controller of the semiconductor memory may be separated into two parts, namely the write data and the write check data. The data processing circuit is configured to generate the write check data of the write data, and the separated write check data is used as the reference check data. If the generated write check data is consistent with the reference check data, the verification is successful, and the write data may be stored into the semiconductor memory cells at this time. If the generated write check data is inconsistent with the reference check data, the verification is unsuccessful, and a policy that fails the verification may be implemented, for example, the write data may be re-requested from the controller.

Through this embodiment, the correctness of the write data may be verified, thereby improving the accuracy of the write data.

Based on the same inventive concept, the embodiments of the present disclosure further provide a data processing method, as shown in the following embodiments. Since the principle of solving the problems in the method embodiments is similar to that in the above apparatus embodiments, the implementation of the method embodiments may refer to the implementation of the above apparatus embodiments, which will not be repeated herein.

Figure 19:
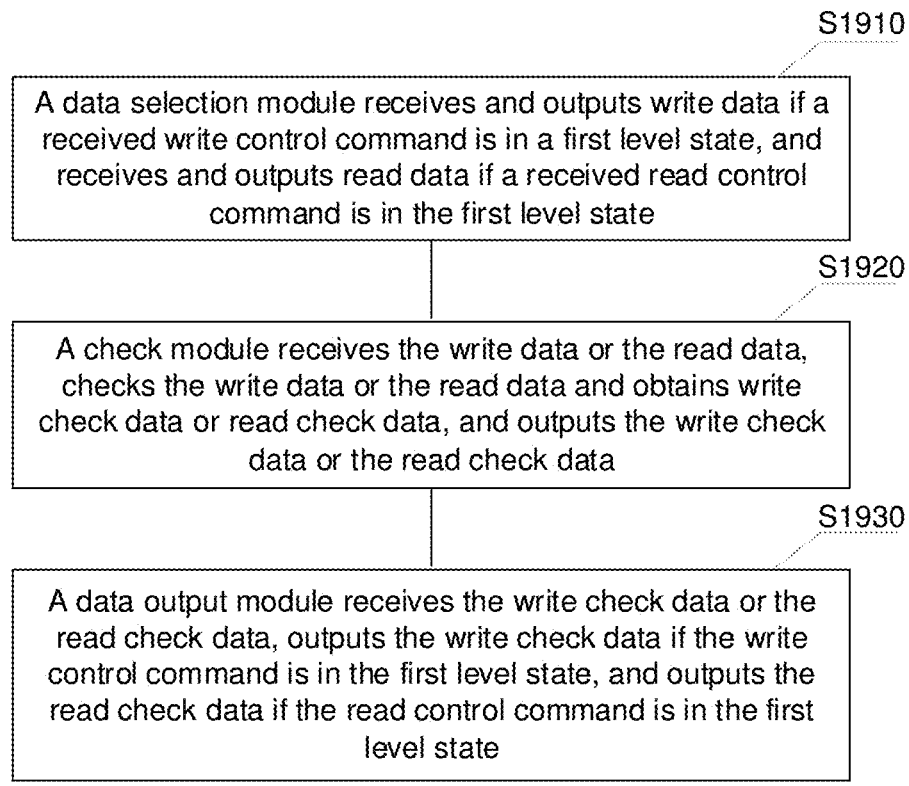
FIG. 19 is a schematic flow diagram of a data processing method according to one embodiment of the present disclosure.

FIG. 19 is a schematic flow diagram of a data processing method according to one embodiment of the present disclosure. As shown in FIG. 19, the data processing method 1900 may include S1910 to S1930.

S1910, the data selection module receives and outputs the write data if the received write control command is in the first level state, and receives and outputs the read data if the received read control command is in the first level state;

S1920, the check module receives the write data or the read data, checks the write data or the read data, and obtains the write check data or the read check data, and outputs the write check data or the read check data; and S1930, the data output module receives the write check data or the read check data, outputs the write check data if the write control command is in the first level state, and outputs the read check data if the read control command is in the first level state.

According to the data processing method provided in the embodiments of the present disclosure, if the write control command is in the first level state, after the write data is received by the data selection module, the write data may be sent to the check module for checking, and the write check data obtained by checking is outputted by the data output module. Moreover, if the read control command is in the first level state, after the read data is received through the data selection module, the read data may be checked by using the check module, and the read check data checked is outputted through the data output module. It is not necessary to process the write data and the read data respectively by using different data processing circuits, the write data or the read data may be selected for checking only through one data processing circuit according to the write control command and the read control command, and the data processing circuit is configured to generate the write check data for performing correctness checking on the write data or generate the read check data for performing the correctness checking on the read data, thereby ensuring the reliability of data reading and writing while taking the size of the semiconductor memory into account.

In some embodiments, after S1910 and before S1920, the data processing method may further include step A1.

Step A1, the sequence adjustment module receives the write data or the read data outputted by the data selection module, performs the data transmission sequence adjustment operation on the write data or the read data according to the sequence adjustment control signal, and adjusts the write data or the read data to the correct transmission sequence and then output it.

Correspondingly, S1920 may include:
the check module receives the write data adjusted to the correct transmission sequence or the read data adjusted to the correct transmission sequence, checks the write data adjusted to the correct transmission sequence or the read data adjusted to the correct transmission sequence to obtain the write check data or the read check data, and outputs the write check data or the read check data.

In some embodiments, the data selection module transmits the write data or the read data of 2n bits to the sequence adjustment module within one data transmission cycle through n data lines. Among the 2n bits, the (n+1)-th bit to the 2n-th bit are transmitted in parallel, the first bit to the n-th bit are transmitted in parallel, the i-th bit and the (i+n)-th bit are serially transmitted by using a same data line, where n is a positive integer greater than or equal to 1, and i is a positive integer greater than or equal to 1 and less than or equal to n.

The sequence adjustment module includes n parallel sequence adjustment sub-modules, and each sequence adjustment sub-module is provided with a data input terminal, a first output terminal, and a second output terminal. The data input terminal of the i-th sequence adjustment sub-module is connected to the data selection module. The first output terminal and the second output terminal of the i-th sequence adjustment sub-module are connected to the check module.

Correspondingly, step A1 may include:
the data input terminal of the i-th sequence adjustment sub-module receives the i-th bit and a sequence of the (i+n)-th bit transmitted within each data transmission cycle, where i is a positive integer greater than or equal to 1 and less than or equal to n; the i-th sequence adjustment sub-module adjusts the sequence of the i-th bit and the sequence of the (i+n)-th bit within each data transmission cycle to the correct transmission sequence, where, if the sequence adjustment control signal indicates that the data transmission sequence is reversed, the sequence of the i-th bit and the sequence of the (i+n)-th bit received within each data transmission cycle are interchanged, and if the sequence adjustment control signal indicates that the data transmission sequence is correct, the sequence of the i-th bit and the sequence of the (i+n)-th bit received within each data transmission cycle remain unchanged; and the first output terminal and the second output terminal of the i-th sequence adjustment sub-module are respectively configured to output, to the check module, the i-th bit adjusted to the correct transmission sequence and the (i+n)-th bit adjusted to the correct transmission sequence.

In some embodiments, the i-th sequence adjustment sub-module may include a data processing unit and a sequence adjustment unit. The data processing unit is provided with an input terminal, a first output terminal, a second output terminal, and a first control terminal. The input is terminal of the data processing unit is used as the data input terminal of the i-th sequence adjustment sub-module. The sequence adjustment unit is provided with a first input terminal, a second input terminal, a first output terminal, a second output terminal, a first control terminal, and a second control terminal. The first input terminal of the sequence adjustment unit is connected to the first output terminal of the data processing unit; the second input terminal of the sequence adjustment unit is connected to the second output terminal of the data processing unit; the first output terminal of the sequence adjustment unit is used as the first output terminal of the i-th sequence adjustment sub-module; and the second output terminal of the sequence adjustment unit is used as the second output terminal of the i-th sequence adjustment sub-module.

Correspondingly, step A1 may include:
The first input terminal of the data processing unit receives the i-th bit and the (i+n)-th bit serially transmitted within each data transmission cycle; the control terminal of the data processing unit receives the first clock signal; in response to the control of the first clock signal, the data processing unit generates, according to the i-th bit and the (i+n)-th bit received serially, the first transmission data and the second transmission data transmitted in parallel, where the first transmission data includes the (i+n)-th bit obtained by sampling at the second trigger edge of the first clock signal, and the second transmission data includes the i-th bit obtained by sampling at the second trigger edge of the first clock signal; and the first output terminal and the second output terminal of the data processing unit are configured to output the first transmission data and the second transmission data in parallel;
the first input terminal of the sequence adjustment unit receives the first transmission data, and the second input terminal of the sequence adjustment unit receives the second transmission data; the first control terminal of the sequence adjustment unit receives the sequence adjustment control signal; the second control terminal of the sequence adjustment unit receives the second clock signal; and the sequence adjustment unit performs sequence adjustment on the first transmission data and the second transmission data according to the sequence adjustment control signal and the second clock signal.

When the sequence adjustment control signal indicates that the data transmission sequence is reversed, if the second clock signal is at the trigger level, the (i+n)-th bit in the first transmission data is outputted as a high-order bit data through the first output terminal of the sequence adjustment unit, and the i-th bit in the second transmission data is outputted as a low-order bit data is through the second output terminal of the sequence adjustment unit. When the sequence adjustment control signal indicates that the data transmission sequence is correct, if the second clock signal is at the trigger level, the i-th bit in the second transmission data is outputted as a high-order bit data through the first output terminal of the sequence adjustment unit, and the (i+n)-th bit in the first transmission data is outputted as a low-order bit data through the second bit output terminal of the sequence adjustment unit.

The trigger level inversion moment of the second clock signal is aligned with the appearance moment of the second trigger edge of the first clock signal, and the trigger level inversion moment of the second clock signal is a moment at which the second clock signal is inverted from a non-trigger level to the trigger level.

In some embodiments, the sequence adjustment unit may include a data selection sub-unit, a first output sub-unit, and a second output sub-unit. The data selection sub-unit is provided with a first input terminal, a second input terminal, a first output terminal, and a second output terminal. The first input terminal of the data selection sub-unit is used as the first input terminal of the sequence adjustment unit; and the second input terminal of the data selection sub-unit is used as the second input terminal of the sequence adjustment unit. The first output sub-unit includes an input terminal, a control terminal, and an output terminal. The input terminal of the first output sub-unit is connected to the first output terminal of the data selection sub-unit; and the control terminal of the first output sub-unit is used as the first output terminal of the sequence adjustment unit. The second output sub-unit includes an input terminal, a control terminal, and an output terminal. The input terminal of the second output sub-unit is connected to the second output terminal of the data selection sub-unit; the control terminal of the second output sub-unit is configured to receive the second clock signal; and the control terminal of the first output sub-unit is connected to the output terminal of the second output sub-unit as the second output terminal of the sequence adjustment unit.

Step A1 may include:

The first input terminal of the data selection sub-unit acquires the first transmission data; the second input terminal of the data selection sub-unit acquires the second transmission data; the data selection sub-unit selectively outputs the first transmission data and the second transmission data at the corresponding output terminal according to the sequence adjustment control signal; if the sequence adjustment control signal indicates that the data transmission sequence is reversed, the first transmission data is outputted at the first output terminal, and the second transmission data is is outputted at the second output terminal; and if the sequence adjustment control signal indicates that the data transmission sequence is correct, the second transmission data is outputted at the first output terminal, and the first transmission data is outputted at the second output terminal.

The first output sub-unit outputs, through the output terminal of the first output sub-unit, the transmission data received by the input terminal of the first output sub-unit if the second clock signal is at the trigger level.

The second output sub-unit outputs, through the output terminal of the second output sub-unit, the transmission data received by the input terminal of the second output sub-unit if the second clock signal is at the trigger level.

The sequence adjustment control signal is determined according to the value of the preset bit in the burst sequence field, where the preset bit is configured to represent whether the data transmission sequence is reversed, and the burst sequence field is obtained by decoding the read and write commands.

In some embodiments, the sequence adjustment control signal may include a first control sub-signal and a second control sub-signal. The first control sub-signal and the second control sub-signal are mutually inverse signals.

The data selection sub-unit may include:
a first data selector including a first data input terminal used as the first input terminal of the data selection sub-unit and configured to receive the first transmission data, a second data input terminal used as the second input terminal of the data selection sub-unit and configured to receive the second transmission data, a first control terminal configured to receive the first control sub-signal, and a first selection output terminal used as the first output terminal of the data selection sub-unit and configured to output the first transmission data if the first control sub-signal is in the second level state and output the second transmission data if the first control sub-signal is in the third level state; and
a second data selector including a third data input terminal connected to the first data input terminal and configured to receive the first transmission data, a fourth data input terminal connected to the second data input terminal and configured to receive the second transmission data, a second control terminal configured to receive the second control sub-signal, and a second selection output terminal used as the second output terminal of the data selection sub-unit and configured to output the first transmission data if the second control sub-signal is in the second level state and output the second transmission data if the second control sub-signal is in the third level state.

In some embodiments, the first output sub-unit may include:
a first latch which may be provided with a first input terminal used as the input terminal of the first output sub-unit, a first in-phase output terminal used as the output terminal of the first output sub-unit, and a third control terminal used as the control terminal of the first output sub-unit. In some embodiments, the second output sub-unit may include:
a second latch which may be provided with a second input terminal used as the input terminal of the second output sub-unit, a second in-phase output terminal used as the output terminal of the second output sub-unit, and a fourth control terminal used as the control terminal of the second output sub-unit.

In some embodiments, the output terminal of the data processing unit may include a third output sub-port and a fourth output sub-port; and the control terminal of the data processing unit includes a first control sub-port and a second control sub-port.

The data processing unit may include:
a first D flip-flop which may be provided with a third input terminal used as the input terminal of the data processing unit and configured to receive the i-th bit and the (i+n)-th bit serially transmitted within each data transmission cycle, a third in-phase output terminal used as the first output terminal of the data processing unit and configured to output the first transmission data, and a fifth control terminal configured to receive the first clock signal; and
a second D flip-flop which may be provided with a fourth input terminal connected to the third in-phase output terminal and configured to receive the first transmission data, a fourth in-phase output terminal used as the second output terminal of the data processing unit and configured to output the second transmission data, and a sixth control terminal connected to the fifth control terminal and configured to receive the first clock signal.

In some embodiments, the write data or the read data of 2n bits is transmitted from the data selection module to the check module within one data transmission cycle through n data lines, and among the 2n bits, the (n+1)-th bit to the 2n-th bit are transmitted in parallel, the first bit to the n-th bit are transmitted in parallel, and the i-th bit and the (i+n)-th bit are serially transmitted by using a same data line, where n is a positive integer greater than or equal to 1, and i is a positive integer greater than or equal to 1 and less than or equal to n.

The data selection module may include n data selection sub-modules arranged in parallel.

S1910 may include: the i-th data selection sub-module outputs the i-th bit and the (i+n)-th bit of the received write data within each data transmission cycle if the write control command is in the first level state, or outputs the i-th bit and the (i+n)-th bit of the received read data within each data transmission cycle if the read control command is in the first level state.

In some embodiments, the i-th data selection sub-module may include a write data selection unit, a read data selection unit, and a signal output unit.

The write data selection unit may include a write data control terminal, a write data input terminal, and a write data output terminal. The write data control terminal is configured to receive the write control command; the write data input terminal is configured to receive the i-th write sub-data, where the i-th write sub-data is the i-th bit and the (i+n)-th bit of the write data within each data transmission cycle; and the write data selection unit is configured to output the i-th write sub-data at the write data output terminal in response to the write control command. If the write control command is in the first level state, the i-th write sub-data is outputted.

The read data selection unit may include a read data control terminal, a read data input terminal, and a read data output terminal. The read data control terminal is configured to receive the read control command; the read data input terminal is configured to receive the i-th read sub-data, where the i-th read sub-data is the i-th bit and the (i+n)-th bit of the read data within each data transmission cycle; and the read data selection unit is configured to output the i-th read sub-data at the read data output terminal in response to the read control command. If the read control command is in the first level state, the i-th read sub-data is outputted.

The signal output unit may include a first input terminal connected to the write data output terminal, a second input terminal connected to the read data output terminal, and an output terminal configured to output the i-th write sub-data or the i-th read sub-data.

In some embodiments, the write data selection unit includes a first AND gate. The first AND gate includes a fifth input terminal used as the write data input terminal, a sixth input terminal used as the write data control terminal, and a third output terminal used as the write data output terminal.

The read data selection unit includes a second AND gate. The second AND gate includes a seventh input terminal used as the read data input terminal, an eighth input terminal used as the read data control terminal, and a fourth output terminal used as the read data output terminal.

The signal output unit includes a NOR gate and a NOT gate. The NOR gate includes a ninth input terminal used as the first input terminal of the signal output unit, a tenth input terminal used as is the second input terminal of the signal output unit, and a fifth output terminal. The NOT gate includes an eleventh input terminal connected to the fifth output terminal, and a sixth output terminal used as the output terminal of the signal output unit.

In some embodiments, the data output module may include a first output sub-module and a second output sub-module.

The first output sub-module includes a write control terminal, a first check data input terminal, and a write check data output terminal. The second output sub-module includes a read control terminal, a second check data input terminal, and a read check data output terminal.

S1930 may include:
the write control terminal receives the write control command, the first check data input terminal receives the write check data or the read check data outputted by the check module, and the write check data output terminal outputs the write check data if the write control command is in the first level state; and
the read control terminal receives the read control command, the second check data input terminal receives the write check data or the read check data outputted by the check module, and the read check data output terminal outputs the read check data if the read control command is in the first level state.

In some embodiments, the first output sub-module may include a third AND gate. The third AND gate includes a twelfth input terminal used as the first check data input terminal, a thirteenth input terminal used as the write control terminal, and a seventh output terminal used as the write check data output terminal.

The second output sub-module may include a fourth AND gate. The fourth AND gate includes a fourteenth input terminal used as the second check data input terminal, a fifteenth input terminal used as the read control terminal, and an eighth output terminal used as the read check data output terminal.

In some embodiments, the data processing method may further include step A2.

Step A2, the signal splicing module acquires the read check data and the read data, splices the read check data and the read data to obtain data to be read, and outputs the data to be read.

In some embodiments, the data processing method may further include step A3.

Step A3, the verification module acquires the write check data and reference check data of the write data, and compares the write check data with the reference check data to obtain a verification is result of the write data.

The data processing method provided in the embodiments of the present disclosure may be configured to implement the data processing circuit provided in the above apparatus embodiments, and the implementation principles and technical effects thereof are similar, which will not be repeated herein for the sake of brevity.

Based on the same inventive concept, the embodiments of the present disclosure further provide a semiconductor memory. The semiconductor memory may include a data processing circuit and a semiconductor memory cell array.

For the data processing circuit, reference may be made to the relevant descriptions in the above part of the embodiments of the present disclosure in conjunction with FIG. 1 to FIG. 18, which will not be repeated herein.

The semiconductor memory may be any of dynamic random access memories, such as a double data rate 4 synchronous dynamic random access memory (DDR4 SDRAM), a low-power double data rate 4 synchronous dynamic random access memory (LPDDR4 SDRAM), a double data rate 5 synchronous dynamic random access memory (DDR5 SDRAM), and a low-power double data rate 5 synchronous dynamic random access memory (LPDDR5 SDRAM), which are not specifically limited.

It should be noted that, the semiconductor memory may also be other memories except the dynamic random access memory, which is not specifically limited.

Figure 20:
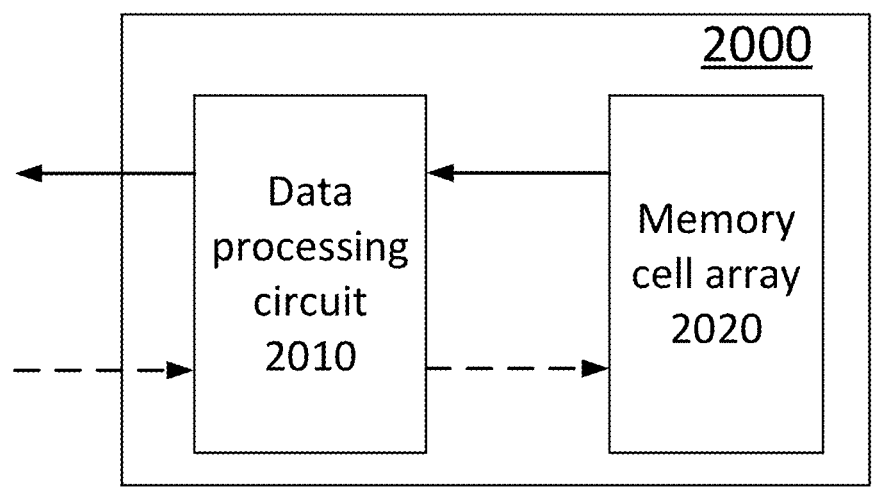
FIG. 20 is a schematic structural diagram of a semiconductor memory according to one embodiment of the present disclosure.

In one example, FIG. 20 is a schematic structural diagram of a semiconductor memory according to one embodiment of the present disclosure. As shown in FIG. 20, the semiconductor memory 2000 may include a data processing circuit 2010 and a memory cell array 2020. The dashed line shows the transmission path for the write data, and the solid line shows the transmission path for the read data.

Specifically, the write data may be stored into the corresponding memory cell array 2020 after being checked by the data processing circuit 2010. The read data may be processed by the data processing circuit 2011 to generate the data to be read for output.

According to semiconductor memory provided in the embodiments of the present disclosure, if the write control command is in the first level state, after the write data is received by the data selection module, the write data may be sent to the check module for checking, and the write check data obtained by checking is outputted by the data output module. Moreover, if the read control is command is in the first level state, after the read data is received through the data selection module, the read data may be checked by using the check module, and the read check data checked is outputted through the data output module. It is not necessary to process the write data and the read data respectively by using different data processing circuits, the write data or the read data may be selected for checking only through one data processing circuit according to the write control command and the read control command, and the data processing circuit is configured to generate the write check data for performing correctness checking on the write data or generate the read check data for performing the correctness checking on the read data, thereby ensuring the reliability of data reading and writing while taking the size of the semiconductor memory into account.

Those skilled in the art can understand that aspects of the present disclosure may be implemented as systems, methods, or program products. Therefore, the aspects of the present disclosure may be specifically implemented in a form of a fully hardware implementation, a fully software implementation (including firmware, microcode, or the like), or a combination of hardware and software, which may be collectively referred to as a "circuit", "module", or "system".

It should be clear that each embodiment in this specification is described in a progressive manner, and the same or similar parts between the various embodiments may be referred to each other, and each embodiment focuses on the differences from other embodiments. The method embodiments are described in a relatively simple manner, and for relevant details, please refer to the description part of the circuit embodiments. The present disclosure is not limited to the particular steps and structures described above and illustrated in the figures. Those skilled in the art may make various changes, modifications and additions, or change the sequence of the steps, after appreciating the spirit of the present disclosure. Also, for the sake of brevity, detailed descriptions of known methods and techniques are omitted herein.

In several embodiments provided in the present disclosure, it should be understood that the disclosed circuit, method and memory may be implemented in other manners. For example, the described apparatus embodiments are merely examples. For example, the unit division is merely a logic function division, and there may be other division manners in actual implementation. For example, a plurality of units or components may be combined or integrated into another system, or some features may be ignored or may not be performed. In addition, the displayed or discussed mutual couplings or direct couplings or communication connections may be implemented by using some ports. The indirect couplings or communication connections between the apparatuses or units may be implemented in electric, mechanical, or other forms.

The units described as separate parts may or may not be physically separate. Parts shown as units may or may not be physical units, may be located in one position, or may be distributed on a plurality of units. Some or all of the units may be selected according to actual requirements to achieve the objective of the solution in this embodiment.

The above described are merely specific implementations of the present disclosure, and the protection scope of the present disclosure is not limited thereto. Any modification or replacement easily conceived by those skilled in the art within the technical scope of the present disclosure should fall within the protection scope of the present disclosure.

Therefore, the protection scope of the present disclosure should be based on the protection scope of the claims. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the claims.

INDUSTRIAL APPLICABILITY

According to the embodiments of the present disclosure, if the write control command is in the first level state, after the write data is received by the data selection module, the write data may be sent to the check module for checking, and the write check data obtained by checking is outputted by the data output module. Or, if the read control command is in the first level state, after the read data is received by the data selection module, the read data may be checked by the check module, and the read check data obtained by checking is outputted by the data output module. It is not necessary to process the write data and the read data respectively by using different data processing circuits, the write data or the read data may be selected for checking only through one data processing circuit according to the write control command and the read control command, and the data processing circuit is configured to generate the write check data for performing correctness checking on the write data or generate the read check data for performing the correctness checking on the read data, thereby ensuring the reliability of data reading and writing while taking the size of the semiconductor memory into account.

The invention claimed is:

1. A data processing circuit, comprising:
   a data selection module, configured to receive and output write data when a received write control command is in a first level state, or receive and output read data when a received read control command is in the first level state; wherein the read control command and the write control command are mutually exclusive signals, when a write operation is performed, the write control command is in the first level state and the read control command is in a fourth level state, when a read operation is performed, the read control command is in the first level state and the write control command is in the fourth level state; when one of the first level state and the fourth level state is at a high level, the other of the first level state and the fourth level state is at a low level;
   a check module, configured to receive the write data or the read data, check the write data or the read data, and obtain write check data or read check data, and output the write check data or the read check data; and
   a data output module, configured to receive the write check data or the read check data, output the write check data when the write control command is in the first level state, or output the read check data when the read control command is in the first level state;
   a sequence adjustment module, wherein the data selection module is connected to the check module through the sequence adjustment module, and the sequence adjustment module is configured to receive the write data or the read data outputted by the data selection module, perform a data transmission sequence adjustment operation on the write data or the read data according to a sequence adjustment control signal, and adjust the write data or the read data to a correct transmission sequence and then output it; and the check module is configured to:

receive the write data adjusted to the correct transmission sequence or the read data adjusted to the correct transmission sequence, check the write data adjusted to the correct transmission sequence or the read data adjusted to the correct transmission sequence, and obtain write check data or read check data, and output the write check data or the read check data, wherein the data selection module is configured to transmit the write data or the read data of 2n bits to the sequence adjustment module within one data transmission cycle through n data lines, and among the 2n bits, an (n+1)-th bit to a 2n-th bit are transmitted in parallel, a first bit to an n-th bit are transmitted in parallel, an i-th bit and an (i+n)-th bit are serially transmitted by using a same data line, wherein n is a positive integer greater than or equal to 1, and i is a positive integer greater than or equal to 1 and less than or equal to n; the sequence adjustment module comprises n parallel sequence adjustment sub-modules, and each of the sequence adjustment sub-modules is provided with a data input terminal, a first output terminal, and a second output terminal, wherein, a data input terminal of an i-th sequence adjustment sub-module is connected to the data selection module for receiving an i-th bit and an (i+n)-th bit transmitted within each data transmission cycle, wherein i is a positive integer greater than or equal to 1 and less than or equal to n; the i-th sequence adjustment sub-module is configured to adjust a sequence of the i-th bit and a sequence of the (i+n)-th bit within each data transmission cycle to the correct transmission sequence, wherein, when the sequence adjustment control signal indicates that a data transmission sequence is reversed, the sequence of the i-th bit and the sequence of the (i+n)-th bit received within each data transmission cycle are interchanged, and when the sequence adjustment control signal indicates that the data transmission sequence is correct, the sequence of the i-th bit and the sequence of the (i+n)-th bit received within each data transmission cycle remain unchanged; and a first output terminal and a second output terminal of the i-th sequence adjustment sub-module are connected to the check module for respectively outputting, to the check module, the i-th bit adjusted to the correct transmission sequence and the (i+n)-th bit adjusted to the correct transmission sequence; wherein the i-th sequence adjustment sub-module comprises: a data processing unit, provided with an input terminal, a first output terminal, a second output terminal, and a control terminal, wherein the input terminal of the data processing unit is used as the data input terminal of the i-th sequence adjustment sub-module and configured to receive the i-th bit and the (i+n)-th bit serially transmitted within each data transmission cycle; the control terminal of the data processing unit is configured to receive a first clock signal, and in response to control of the first clock signal, the data processing unit is configured to generate, according to the i-th bit and the (i+n)-th bit received serially, first transmission data and second transmission data transmitted in parallel, the first transmission data comprising data of the (i+n)-th bit obtained by sampling at a second trigger edge of the first clock signal, and the second transmission data comprising data of the i-th bit obtained by sampling at the second trigger edge of the first clock signal; and the first output terminal and the second output terminal of the data processing unit are configured to output the first transmission data and the second transmission data in parallel; and a sequence adjustment unit, provided with a first input terminal, a second input terminal, a first output terminal, a second output terminal, a first control terminal, and a second control terminal, wherein the first input terminal of the sequence adjustment unit is connected to the first output terminal of the data processing unit and configured to receive the first transmission data; the second input terminal of the sequence adjustment unit is connected to the second output terminal of the data processing unit and configured to receive the second transmission data; the first output terminal of the sequence adjustment unit is used as the first output terminal of the i-th sequence adjustment sub-module; the second output terminal of the sequence adjustment unit is used as the second output terminal of the i-th sequence adjustment sub-module; the first control terminal of the sequence adjustment unit is configured to receive the sequence adjustment control signal; the second control terminal of the sequence adjustment unit is configured to receive a second clock signal; the sequence adjustment unit performs sequence adjustment on the first transmission data and the second transmission data according to the sequence adjustment control signal and the second clock signal; when the sequence adjustment control signal indicates that the data transmission sequence is reversed, and the second clock signal is at a trigger level, the (i+n)-th bit in the first transmission data is outputted as high-order bit data through the first output terminal of the sequence adjustment unit, and the i-th bit in the second transmission data is outputted as low-order bit data through the second output terminal of the sequence adjustment unit; and when the sequence adjustment control signal indicates that the data transmission sequence is correct, and the second clock signal is at the trigger level, the i-th bit in the second transmission data is outputted as high-order bit data through the first output terminal of the sequence adjustment unit, and the (i+n)-th bit in the first transmission data is outputted as low-order bit data through the second output terminal of the sequence adjustment unit; wherein, a trigger level inversion moment of the second clock signal is aligned with an appearance moment of the second trigger edge of the first clock signal, and the trigger level inversion moment of the second clock signal is a moment at which the second clock signal is inverted from a non-trigger level to the trigger level.

2. The data processing circuit according to claim 1, wherein the sequence adjustment unit comprises:

a data selection sub-unit, provided with a first input terminal, a second input terminal, a first output terminal, and a second output terminal, wherein the first input terminal of the data selection sub-unit is used as the first input terminal of the sequence adjustment unit and configured to acquire the first transmission data; the second input terminal of the data selection sub-unit is used as the second input terminal of the sequence adjustment unit and configured to acquire the second transmission data; the data selection sub-unit is configured to selectively output the first transmission data and the second transmission data at the corresponding output terminal according to the sequence adjustment control signal; when the sequence adjustment control signal indicates that the data transmission sequence is reversed, the first transmission data is outputted at the first output terminal, and the second transmission data is outputted at the second output terminal; and when the sequence adjustment control signal indicates that the data transmission sequence is correct, the second transmission data is outputted at the first output terminal, and the first transmission data is outputted at the second output terminal;

a first output sub-unit, comprising an input terminal, a control terminal, and an output terminal, wherein the input terminal of the first output sub-unit is connected to the first output terminal of the data selection sub-unit; the control terminal of the first output sub-unit is configured to receive the second clock signal; the output terminal of the first output sub-unit is used as the first output terminal of the sequence adjustment unit; and the first output sub-unit is configured to output, through the output terminal of the first output sub-unit, the transmission data received by the input terminal of the first output sub-unit when the second clock signal is at the trigger level; and a second output sub-unit, comprising an input terminal, a control terminal, and an output terminal, wherein the input terminal of the second output sub-unit is connected to the second output terminal of the data selection sub-unit; the control terminal of the second output sub-unit is connected to the control terminal of the first output sub-unit; the output terminal of the second output sub-unit is used as the second output terminal of the sequence adjustment unit; and the second output sub-unit is configured to output, through the output terminal of the second output sub-unit, the transmission data received by the input terminal of the second output sub-unit when the second clock signal is at the trigger level; and the sequence adjustment control signal is determined according to a value of a preset bit in a burst sequence field, wherein the preset bit is configured to represent whether the data transmission sequence is reversed, and the burst sequence field is obtained by decoding read and write commands.

3. The data processing circuit according to claim 2, wherein the sequence adjustment control signal comprises a first control sub-signal and a second control sub-signal, and the first control sub-signal and the second control sub-signal are mutually inverse signals; and the data selection sub-unit comprises:

a first data selector, comprising a first data input terminal used as the first input terminal of the data selection sub-unit and configured to receive the first transmission data, a second data input terminal used as the second input terminal of the data selection sub-unit and configured to receive the second transmission data, a first control terminal configured to receive the first control sub-signal, and a first selection output terminal used as the first output terminal of the data selection sub-unit and configured to output the first transmission data when the first control sub-signal is in a second level state and output the second transmission data when the first control sub-signal is in a third level state; and a second data selector, comprising a third data input terminal connected to the first data input terminal and configured to receive the first transmission data, a fourth data input terminal connected to the second data input terminal and configured to receive the second transmission data, a second control terminal configured to receive the second control sub-signal, and a second selection output terminal used as the second output terminal of the data selection sub-unit and configured to output the first transmission data when the second control sub-signal is in the second level state and output the second transmission data when the second control sub-signal is in the third level state.

4. The data processing circuit according to claim 2, wherein the first output sub-unit comprises:

a first latch, provided with a first input terminal used as the input terminal of the first output sub-unit, a first in-phase output terminal used as the output terminal of the first output sub-unit, and a third control terminal used as the control terminal of the first output sub-unit; and the second output sub-unit comprises:

a second latch, provided with a second input terminal used as the input terminal of the second output sub-unit, a second in-phase output terminal used as the output terminal of the second output sub-unit, and a fourth control terminal used as the control terminal of the second output sub-unit.

5. The data processing circuit according to claim 1, wherein the data processing unit comprises:

a first D flip-flop, provided with a third input terminal used as the input terminal of the data processing unit and configured to receive the i-th bit and the (i+n)-th bit serially transmitted within each data transmission cycle, a third in-phase output terminal used as the first output terminal of the data processing unit and configured to output the first transmission data, and a fifth control terminal configured to receive the first clock signal; and a second D flip-flop, provided with a fourth input terminal connected to the third in-phase output terminal and configured to receive the first transmission data, a fourth in-phase output terminal used as the second output terminal of the data processing unit and configured to output the second transmission data, and a sixth control terminal connected to the fifth control terminal and configured to receive the first clock signal.

6. The data processing circuit according to claim 1, wherein the write data or the read data of 2n bits is transmitted from the data selection module to the check module within one data transmission cycle through n data lines, and among the 2n bits, an (n+1)-th bit to a 2n-th bit are transmitted in parallel, a first bit to an n-th bit are transmitted in parallel, an i-th bit and an (i+n)-th bit are serially transmitted by using a same data line, wherein n is a positive integer greater than or equal to 1, and i is a positive integer greater than or equal to 1 and less than or equal to n;

the data selection module comprises n data selection sub-modules arranged in parallel, wherein, an i-th data selection sub-module is configured to output an i-th bit and an (i+n)-th bit of the received write data within each data transmission cycle when the write control command is in the first level state, or output an i-th bit and an (i+n)-th bit of the received read data within each data transmission cycle when the read control command is in the first level state.

7. The data processing circuit according to claim 6, wherein the i-th data selection sub-module comprises:

a write data selection unit, comprising a write data control terminal, a write data input terminal, and a write data output terminal, wherein the write data control terminal is configured to receive the write control command; the write data input terminal is configured to receive i-th write sub-data, the i-th write sub-data being the i-th bit and the (i+n)-th bit of the write data within each data transmission cycle; and the write data selection unit is configured to output the i-th write sub-data at the write data output terminal in response to the write control command; wherein, when the write control command is in the first level state, the i-th write sub-data is outputted;

a read data selection unit, comprising a read data control terminal, a read data input terminal, and a read data output terminal, wherein the read data control terminal is configured to receive the read control command; the read data input terminal is configured to receive i-th read sub-data, the i-th read sub-data being the i-th bit and the (i+n)-th bit of the read data within each data transmission cycle; and the read data selection unit is configured to output the i-th read sub-data at the read data output terminal in response to the read control command; wherein, when the read control command is in the first level state, the i-th read sub-data is outputted; and a signal output unit, comprising a first input terminal connected to the write data output terminal, a second input terminal connected to the read data output terminal, and an output terminal configured to output the i-th write sub-data or the i-th read sub-data.

8. The data processing circuit according to claim 7, wherein the write data selection unit comprises a first AND gate, wherein the first AND gate comprises a fifth input terminal used as the write data input terminal, a sixth input terminal used as the write data control terminal, and a third output terminal used as the write data output terminal;

the read data selection unit comprises a second AND gate, wherein the second AND gate comprises a seventh input terminal used as the read data input terminal, an eighth input terminal used as the read data control terminal, and a fourth output terminal used as the read data output terminal; and the signal output unit comprises a NOR gate and a NOT gate, wherein the NOR gate comprises a ninth input terminal used as the first input terminal of the signal output unit, a tenth input terminal used as the second input terminal of the signal output unit, and a fifth output terminal; and the NOT gate comprises an eleventh input terminal connected to the fifth output terminal, and a sixth output terminal used as the output terminal of the signal output unit.

9. The data processing circuit according to claim 1, wherein the data output module comprises:

a first output sub-module, comprising a write control terminal configured to receive the write control command, a first check data input terminal configured to receive the write check data or the read check data outputted by the check module, and a write check data output terminal configured to output the write check data when the write control command is in the first level state; and a second output sub-module, comprising a read control terminal configured to receive the read control command, a second check data input terminal connected to the first check data input terminal and configured to receive the write check data or the read check data outputted by the check module, and a read check data output terminal configured to output the read check data when the read control command is in the first level state.

10. The data processing circuit according to claim 9, wherein the first output sub-module comprises a third AND gate, wherein the third AND gate comprises a twelfth input terminal used as the first check data input terminal, a thirteenth input terminal used as the write control terminal, and a seventh output terminal used as the write check data output terminal; and the second output sub-module comprises a fourth AND gate, wherein the fourth AND gate comprises a fourteenth input terminal used as the second check data input terminal, a fifteenth input terminal used as the read control terminal, and an eighth output terminal used as the read check data output terminal.

11. The data processing circuit according to claim 1, further comprises at least one of:

a signal splicing module, configured to acquire the read check data outputted by the data output module and the read data, splice the read check data and the read data to obtain data to be read, and output the data to be read; or a verification module, configured to acquire the write check data outputted by the data output module and reference check data of the write data, and compare the write check data with the reference check data to obtain a verification result of the write data.

12. A data processing method applied to the data processing circuit according to claim 1, comprising:

receiving and outputting, by a data selection module, write data when a received write control command is in a first level state, and receiving and outputting, by the data selection module, read data when a received read control command is in the first level state;

receiving, by a check module, the write data or the read data, checking the write data or the read data, and obtaining write check data or read check data, and outputting the write check data or the read check data; and receiving, by a data output module, the write check data or the read check data, outputting the write check data when the write control command is in the first level state, and outputting the read check data when the read control command is in the first level state.

13. A semiconductor memory, comprising:
the data processing circuit according to claim 1; and
a memory cell array.

* * * * *